(12) United States Patent
Oh et al.

(10) Patent No.: US 8,284,373 B2
(45) Date of Patent: *Oct. 9, 2012

(54) LIQUID CRYSTAL DISPLAY DEVICE AND METHOD OF FABRICATING THE SAME

(75) Inventors: Chang Ho Oh, Taegu-kwangyokshi (KR); Jeom Jae Kim, Seoul (KR); Hong Man Moon, Kyongsangbuk-do (KR); Sung Hak Jo, Seoul (KR); Mon Soo Kang, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 512 days.

This patent is subject to a terminal disclaimer.

(21) Appl. No.: 12/457,620

(22) Filed: Jun. 17, 2009

(65) Prior Publication Data

US 2009/0316105 A1 Dec. 24, 2009

Related U.S. Application Data

(62) Division of application No. 10/864,858, filed on Jun. 10, 2004, now Pat. No. 7,561,245.

(30) Foreign Application Priority Data

Feb. 25, 2004 (KR) ................ P2004-12692
Apr. 28, 2004 (KR) ................ P2004-29431

(51) Int. Cl.
*G02F 1/1339* (2006.01)
*G02F 1/1343* (2006.01)

(52) U.S. Cl. ................ 349/156; 349/143

(58) Field of Classification Search .......... 349/153–156, 349/190, 139, 143

See application file for complete search history.

(56) References Cited

U.S. PATENT DOCUMENTS

| 5,499,128 | A | 3/1996 | Hasegawa et al. |
| 6,724,452 | B1 | 4/2004 | Takeda et al. |
| 7,502,090 | B2 * | 3/2009 | Oh et al. ............ 349/156 |
| 2001/0026347 | A1 | 10/2001 | Sawasaki et al. |
| 2002/0008836 | A1 | 1/2002 | Shibahara |
| 2002/0067450 | A1 | 6/2002 | Moriya |
| 2002/0075443 | A1 | 6/2002 | Shimizu et al. |
| 2003/0193640 | A1 | 10/2003 | Park et al. |

FOREIGN PATENT DOCUMENTS

| JP | 10-39318 | 2/1998 |
| JP | 10-039318 | 2/1998 |
| JP | 10-48640 | 2/1998 |
| JP | 10-048640 | 2/1998 |
| JP | 11-242225 | 9/1999 |
| JP | 2000-298280 | 10/2000 |
| JP | 2001-264773 | 9/2001 |
| JP | 2002-341354 | 11/2002 |
| JP | 2003-075808 | 3/2003 |

* cited by examiner

*Primary Examiner* — Dung T. Nguyen
(74) *Attorney, Agent, or Firm* — Morgan, Lewis & Bockius LLP

(57) ABSTRACT

A liquid crystal display (LCD) device includes a first substrate having a plurality of column spacers fixed thereto, a second substrate facing the first substrate, and having a plurality of projections at portions corresponding to the column spacers, the projections contacting the column spacers, and a liquid crystal layer between the first and second substrates.

8 Claims, 21 Drawing Sheets

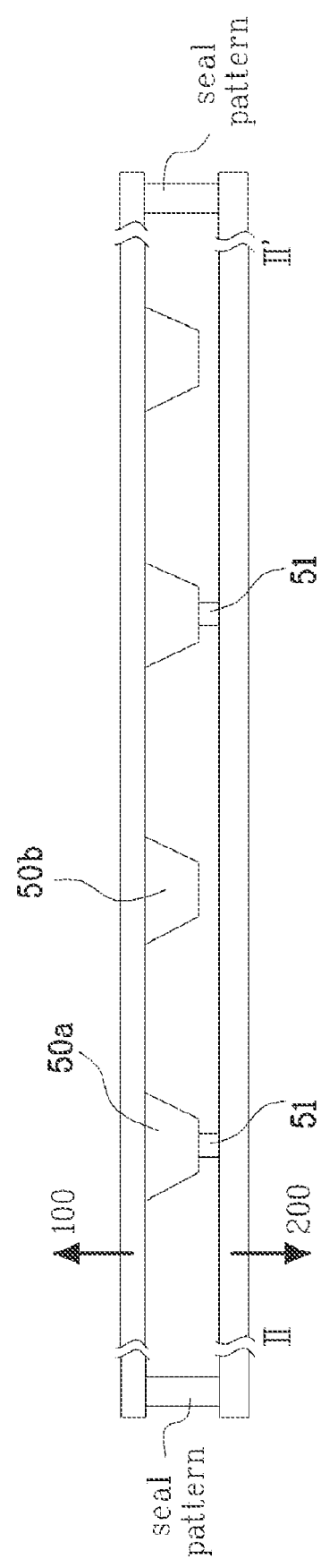

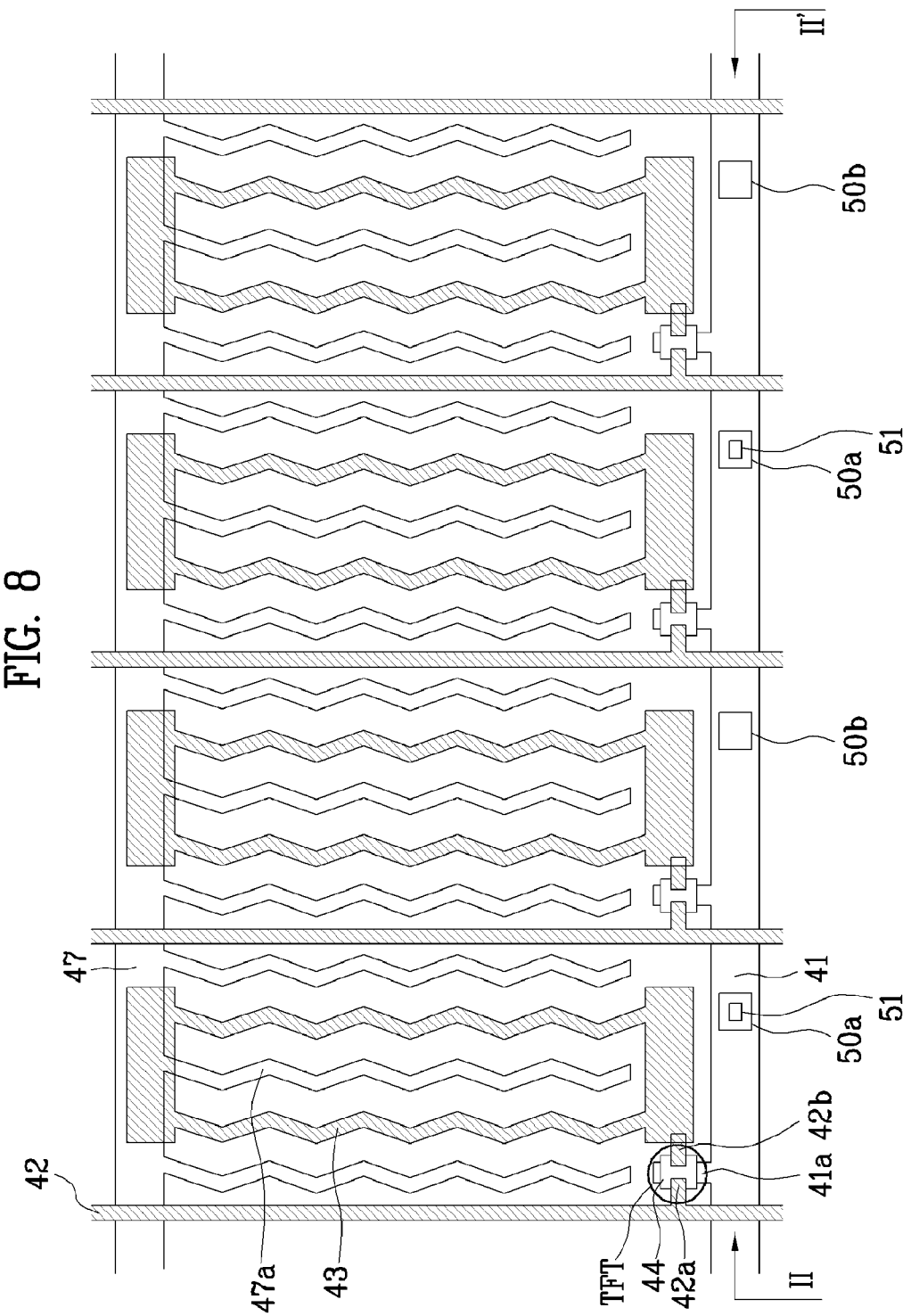

LIQUID CRYSTAL DISPLAY DEVICE AND METHOD OF FABRICATING THE SAME

This is a divisional application of application Ser. No. 10/864,858, filed on Jun. 10, 2004, now U.S. Pat. No. 7,561,245 which is hereby incorporated by reference.

This application claims the benefit of the Korean Application Nos. P2004-12692 and P2004-29431, filed on Feb. 25, 2004 and Apr. 28, 2004, respectively, which are hereby incorporated by reference.

BACKGROUND OF THE INVENTION

1. Field of the Invention

The present invention relates to a display device and a method of fabricating a display device, and more particularly, to a liquid crystal display (LCD) device and a method of fabricating an LCD device.

2. Discussion of the Related Art

As demand for various display devices increases, development of various types of flat display devices, such as LCD devices, plasma display panel (PDP) devices, electroluminescent display (ELD) devices, and vacuum fluorescent display (VFD) devices, has increased. Among these various flat display devices, LCD devices have been used commonly because of their thin profile, light weight, and low power consumption. For example, LCD devices are used commonly as a substitute for cathode ray tube (CRT) devices. In addition, LCD devices are used commonly in notebook computers, computer monitors, and televisions. However, in order to use LCD devices in general display devices, the LCD devices must be developed having high quality images, such as high resolution and high luminance with a large-sized screen, while still maintaining their light weight, thin profile, and low power consumption.

FIG. 1 is a schematic perspective view of an LCD device according to the related art. In FIG. 1, an LCD device includes first and second substrates 1 and 2, and a liquid crystal layer between the first and second substrates 1 and 2 formed by an injection method. The first substrate 1 includes a plurality of gate lines 4 arranged along a first direction at fixed intervals, a plurality of data lines 5 arranged along a second direction perpendicular to the first direction at fixed intervals, a plurality of pixel electrodes 6 arranged in a matrix configuration within pixel regions P defined by crossing of the gate and data lines 4 and 5, and a plurality of thin film transistors T enabled according to signals supplied to the gate lines 4 for transmitting signals from the data lines 5 to the pixel electrodes 6. The second substrate 2 includes a black matrix layer 7 that prevents light from portions of the first substrate 1, except for the pixel regions P, an R/G/B color filter layer 8 for displaying colored light, and a common electrode 9 for producing images.

In FIG. 1, since the liquid crystal layer 3 is formed between the first and second substrates 1 and 2, liquid crystal molecules of the liquid crystal layer 3 are driven by an electric field generated between the pixel electrode 6 and the common electrode 9. For example, an alignment direction of the liquid crystal molecules of the liquid crystal layer 3 is controlled by the induced electric field thereto. Accordingly, light irradiated through the liquid crystal layer 3 may be controlled by the alignment direction of the liquid crystal molecules, thereby displaying images. The LCD device of FIG. 1 is commonly referred to as a twised neumatic (TN) mode LCD device, which has disadvantageous characteristics, such as narrow viewing angles.

In order to overcome these problems of the TN mode LCD device, an in-plane switching (IPS) mode LCD device has been developed. In the IPS mode LCD device, a pixel electrode and a common electrode are formed in a pixel region in parallel to each other at a fixed interval therebetween. Accordingly, an electric field parallel to substrates is generated between the pixel electrode and the common electrode, thereby aligning liquid crystal molecules of a liquid crystal layer by the electric field parallel to the substrates.

FIGS. 2 and 3 are flow charts of method for fabricating an LCD device according to the related art, wherein FIG. 2 shows a liquid crystal injection method and FIG. 3 shows a liquid crystal dispersion method.

In FIG. 2, the method for fabricating an LCD device is divided into three processes, including an array process, a cell process, and a module process. The array process largely includes two steps of forming a TFT array having gate and data lines, a pixel electrode, and a thin film transistor on a first substrate, and forming a color filter array having a black matrix layer, a color filter layer, and a common electrode on a second substrate. During the array process, a plurality of LCD panels are formed on one large-sized glass substrate, and the TFT array and the color filter array are formed within each of the LCD panels. Then, the TFT substrate and the color filter substrate are moved to a cell process line. Subsequently, an alignment material is coated on the TFT substrate and the color filter substrate, and an alignment process (i.e., rubbing process) S10 is performed to the substrates to obtain a uniform alignment direction of liquid crystal molecules. At this time, the alignment process S10 is carried out in order of processes for cleaning before coating of an alignment layer, printing the alignment layer, baking the alignment layer, inspecting the alignment layer, and rubbing the alignment layer. Accordingly, the TFT substrate and the color filter substrate are respectively cleaned (S20).

Then, ball spacers for maintaining a cell gap between the two substrates are scattered on one of the two substrates (S30), and a seal pattern is formed corresponding to the circumference of respective LCD panel regions to bond the two substrates to each other (S40). At this time, the seal pattern includes a liquid crystal injection inlet through which liquid crystal material is injected. The ball spacers are formed of plastic balls or minute elastic particles. Then, the TFT substrate and the color filter substrate having the seal pattern therebetween are positioned to oppose each other and bonded to each other, and then the seal pattern is hardened (S50).

Then, the bonded TFT and color filter substrates are cut into individual LCD panel regions (S60), thereby manufacturing the unit LCD panels each having a fixed size. Subsequently, the liquid crystal material is injected to the LCD panel through the liquid crystal injection inlet, and the liquid crystal injection inlet is sealed (S70), thereby forming a liquid crystal layer.

After an inspection process (S80) for observing external appearances and testing for electric failures in the LCD panel is performed, the process of manufacturing the LCD device is completed.

During the process for injecting the liquid crystal material, the LCD panel and a container having liquid crystal material therein are provided within a vacuum chamber. Accordingly, moisture and air bubbles in the liquid crystal material and the container are simultaneously removed, and an interior space of the LCD panel is maintained in a vacuum state. Then, the liquid crystal injection inlet of the LCD panel is dipped into the container having the liquid crystal material in the vacuum state, and the vacuum state inside the chamber is changed to an atmospheric pressure. Thus, the liquid crystal material is injected into the interior of the LCD panel through the liquid crystal injection inlet according to a pressure difference between the interior of the LCD panel and the vacuum chamber.

However, the injection method has the following disadvantages. First, after cutting the large-sized glass substrate into the LCD panel regions, the liquid crystal injection inlet is dipped into the container having the liquid crystal material while maintaining the vacuum state between the two substrates. Thus, significant amounts of time are required for injecting the liquid crystal material between the two substrates, thereby lowering production yield. When forming large-sized LCD devices, it is difficult to completely inject the liquid crystal material into the inside of the LCD panel, thereby causing the failure due to incomplete injection of the liquid crystal material. Furthermore, significant amounts of time are required for injecting the liquid crystal material into large-sized spaces for large-sized LCD devices.

In order to overcome these problems of the liquid crystal injection method, the liquid crystal dispersion method has been developed, in which two substrates are bonded to each other after dispersing liquid crystal material on any one of the two substrates. In FIG. 3, before bonding the two substrates, the liquid crystal material is dispersed on any one of the two substrates. Accordingly, it is impossible to use ball spacers for maintaining a cell gap between the two substrates since the ball spacers move along a dispersion direction of the liquid crystal material. Thus, instead of the ball spacers, patterned spacers or column spacers are fixed to the substrate to maintain the cell gap between the two substrates. As shown in FIG. 3, during an array process, a black matrix layer, a color filter layer, and an overcoat layer are formed on the color filter substrate. Then, a photosensitive resin is formed on the overcoat layer, and selectively removed to form the column spacer on the overcoat layer above the black matrix layer. The column spacers may be formed in a photo process or an ink-jet process.

Then, alignment layers are respectively coated on entire surfaces of the TFT substrate and the color filter substrate including the column spacers, and a rubbing process is performed thereto. After cleaning the TFT substrate and the color filter substrate (S101), the liquid crystal material is dispersed on one of the two substrates (S102), and a seal pattern is formed in the circumference of an LCD panel region on the other of the two substrates by a dispensing device (S103). At this time, it is possible to perform dispersion of the liquid crystal and formation of the seal pattern on any one of the two substrates.

After the other substrate having no dispersion of the liquid crystal material is inversed (S104), the TFT substrate and the color filter substrate are bonded to each other by pressure, and the seal patterned is hardened (S1105). Subsequently, the bonded substrates are cut into the respective LCD panels (S106). In addition, an inspection process (S107) for observing external appearances and tests for electric failures in the LCD panel are performed, so that the process of manufacturing the LCD device is completed.

In the method of manufacturing the LCD device according to the liquid crystal dispersion method, the column spacer is formed on the color filter substrate, and the liquid crystal material is dispersed on the TFT substrate, then the two substrates are bonded to each other, thereby forming the LCD panel. Accordingly, the column spacer is fixed on the predetermined portion of the color filter substrate. In addition, the column spacer having a predetermined height is in contact with the predetermined portion of the TFT substrate corresponding to the gate or data line.

However, the column spacer of the LCD device according to the liquid crystal dispersion method causes the following problems to the LCD panel. For example, when the LCD device is formed by the liquid crystal dispersion method, the column spacers are formed on the color filter substrate corresponding to the gate or data line. Accordingly, the column spacers are formed at the same height to be corresponding to the line region having the same width (gate or data line). In addition, the columns spacers having the same height are formed on the color filter substrate opposite to the TFT substrate, and the two substrates are bonded to each other. Since the supportive force of the column spacers is weak, the LCD panel may suffer from problems due to gravity. For example, when the LCD device is at a high temperature, the LCD panel may have a protruding portion because the liquid crystal material has large thermal expansion characteristics. When the LCD panel is placed in a vertical direction, the liquid crystal molecules of the LCD panel migrate to the lower-corner direction, thereby causing a gathering of liquid crystal molecules to the predetermined portion on the LCD panel due to the effects of gravity.

FIG. 4 is a cross sectional view of bonded TFT and color filter substrates having column spacers according to the related art. In FIG. 4, a plurality of column spacers 20 are formed on a black matrix layer (not shown) of a color filter substrate 2 at fixed intervals, wherein each of the column spacers 20 is formed at a height "h." Then, the color filter substrate 2 having the column spacers 20 thereon is bonded to a TFT substrate 1. Accordingly, the height "h" of the column spacer 20 decreases to a height "h'" due to pressure created during the bonding process.

In FIG. 4, the column spacers 20 are formed on the portions corresponding to the line regions having the same width. Furthermore, since the column spacers 20 are patterned, the column spacers 20 may each have slightly different heights, whereby it is impossible to obtain uniformity of gravity on the entire regions of the LCD panel. As compared with ball spacers, each having a spherical end, the column spacer has a larger contact area with the substrate, thereby generating significant frictional forces between the column spacer 20 and the substrate. Accordingly, if a screen of the LCD device having the column spacers 20 is touched, spots will be generated on the screen and will remain for a long time.

FIG. 5A is a plan view of an LCD device according to the related art, and FIG. 5B is a cross sectional view along I-I' of FIG. 5A according to the related art. In FIG. 5A, if an LCD panel 10 is continuously touched with a finger along a predetermined direction, the upper substrate 2 of the LCD panel is shifted at a predetermined interval along the touch direction, as shown in FIG. 5B. When the cylindrical column spacers are in contact with the lower and upper substrates 1 and 2, they cause significant frictional forces between the column spacers and the two opposing substrates. Thus, the liquid crystal molecules between the column spacers are not restored to their original states, thereby generating spots on the screen. In addition, when the LCD panel is touched with the finger along the predetermined direction, as shown in FIG. 5B, the liquid crystal molecules gather within the region around the touched portion, whereby the region around the touched portion protrudes. In this case, the cell gap "h1" corresponding to the protruding portion is higher than the cell gap "h2" of the remaining portions, thereby causing light leakage. Meanwhile, since the touched portion has no liquid crystal molecules, blurred portions appear on the screen in a black state, thereby deteriorating luminance of the LCD panel 10. Furthermore, the ball spacers are formed on the substrate in a large amount, but the column spacers are selectively formed on the predetermined regions of the LCD panel. Accordingly, when the LCD panel is pressed at a predetermined portion having no column spacers, the substrates bend and form a hollow state due to low restoring speed of the substrates, thereby generating spots on the screen of the LCD panel.

SUMMARY OF THE INVENTION

Accordingly, the present invention is directed to an LCD device and a method of fabricating an LCD device that substantially obviates one or more problems due to limitations and disadvantages of the related art.

An object of the present invention is to provide an LCD device that prevents formation of hollow portions within a LCD panel.

Another object of the present invention is to provide a method of fabricating an LCD device that prevents formation of hollow portions within a LCD panel.

Additional features and advantages of the invention will be set forth in the description which follows, and in part will be apparent form the description or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, a liquid crystal display (LCD) device includes a first substrate having a plurality of column spacers fixed thereto, a second substrate facing the first substrate, and having a plurality of projections at portions corresponding to the column spacers, the projections contacting the column spacers, and a liquid crystal layer between the first and second substrates.

In another aspect, a liquid crystal display (LCD) device includes a first substrate having a plurality of first and second column spacers fixed thereto, a second substrate facing the first substrate, and having a plurality of projections at portions corresponding to the first column spacers, each of the projections contacting one of the first column spacers, and a liquid crystal layer between the first and second substrates.

In another aspect, a liquid crystal display (LCD) device includes first and second substrates facing each other, a plurality of first and second column spacers on the first substrate, gate and data lines crossing each other on the second substrate to define a plurality of pixel regions, a thin film transistor including a semiconductor layer and source and drain electrodes disposed at each crossing region of the gate and data lines; a passivation layer on the second substrate, the passivation layer having a contact hole including the drain electrode, a plurality of pixel electrodes each within one of the pixel regions on the passivation layer electrically connected to the drain electrode of the thin film transistor, a plurality of projections on the passivation layer each corresponding to and contacting one of the first column spacers, and a liquid crystal layer between the first and second substrates.

In another aspect, a liquid crystal display (LCD) device includes first and second substrates facing each other, a plurality of first and second column spacers on the first substrate, gate and data lines crossing each other on the second substrate to define a plurality of pixel regions, a common line parallel to the gate line, the common line having a plurality of common electrodes extending therefrom in parallel to the data line, a thin film transistor at each crossing region of the gate and data lines, the thin film transistor including a semiconductor layer and source and drain electrodes, a passivation layer on the second substrate having a contact hole including the drain electrode, a plurality of pixel electrodes on the passivation layer, each connected to the drain electrode of the thin film transistor, and each spaced parallel to the common electrodes at a fixed interval within the pixel regions, a plurality of projections on the passivation layer each corresponding to and contacting one of the first column spacers, and a liquid crystal layer between the first and second substrates.

In another aspect, a liquid crystal display (LCD) device includes first and second substrates facing each other, a plurality of first and second column spacers on the first substrate, a plurality of gate lines and corresponding plurality of gate electrodes on the second substrate, a gate insulating layer on an entire surface of the second substrate including the gate line and the gate electrode, a semiconductor layer and a first projection pattern on the gate insulating layer corresponding to each of the gate electrodes and the first column spacers, a plurality of data lines perpendicular to the gate lines to define a plurality of pixel regions, source and drain electrodes at both sides of the semiconductor layer, a second projection pattern on the first projection pattern, a passivation layer on the second substrate having a contact hole including the drain electrode, a plurality of pixel electrodes on the passivation layer, each connected to the drain electrode of the thin film transistor and each within one of the pixel regions, and a liquid crystal layer between the first and second substrates.

In another aspect, a liquid crystal display (LCD) device includes first and second substrates facing each other, a plurality of first and second column spacers on the first substrate, a plurality of gate lines and gate electrodes on the second substrate, a common line having a plurality of common electrodes each parallel to the gate lines, a gate insulating layer on an entire surface of the second substrate including the gate lines and the common line, a semiconductor layer and a first projection pattern on the gate insulating layer corresponding to each of the gate electrodes and each of the first column spacers, a plurality of data lines perpendicular to the gate lines to define a plurality of pixel regions, source and drain electrodes at both sides of the semiconductor layer, a second projection pattern on the first projection pattern, a passivation layer on the second substrate having a contact hole including the drain electrode, a plurality of pixel electrodes each connected to the drain electrode of the thin film transistor, and each spaced parallel to the common electrodes at a fixed interval within one of the pixel regions, and a liquid crystal layer between the first and second substrates.

In another aspect, a liquid crystal display (LCD) device includes first and second substrates facing each other and having a plurality of pixel regions, a plurality of projections on the second substrate each corresponding to one of the pixel regions, first and second column spacers on the first substrate, each formed within two different ones of the pixel regions at every three pixel regions, each of the first column spacers overlapped by one of the projections, and each of the second column spacers not overlapped by the projections, and a liquid crystal layer between the first and second substrates.

In another aspect, a liquid crystal display (LCD) device includes first and second substrates facing each other, a plurality of gate lines and gate electrodes on the second substrate, a gate insulating layer on an entire surface of the second substrate including the gate line and the gate electrode, a semiconductor layer and a first projection pattern on the gate insulating layer corresponding to each of the gate electrodes and a predetermined portion of each of the gate lines, a plurality of data lines perpendicular to the gate lines to define a plurality of pixel regions, source and drain electrodes at both sides of the semiconductor layer, a second projection pattern on the first projection pattern, a passivation layer on the second substrate having a contact hole including the drain electrode, a plurality of pixel electrodes on the passivation layer, each within one of the pixel regions and each connected to the drain electrode, first and second column spacers on the first substrate, each formed within two different ones of the pixel regions at every three pixel regions, each of the first column spacers overlapped by one of the projections, and each of the second column spacers not overlapped with the projections, and a liquid crystal layer between the first and second substrates.

In another aspect, a method of fabricating a liquid crystal display (LCD) device includes forming a plurality of column spacers on a first substrate, forming at least one projection on a second substrate corresponding to one of the column spacers, dispensing a liquid crystal material onto one of the first and second substrates, patterning a seal pattern on one of the first and second substrates, and bonding the first and second substrates together such that the one of the column spacers and the projection contact each other.

In another aspect, a method of fabricating a liquid crystal display (LCD) device includes forming a plurality of first and second column spacers on a first substrate, forming at least one projection on a second substrate corresponding to one of the first column spacers, dispensing a liquid crystal material onto one of the first and second substrates, forming a seal pattern on one of the first and second substrates, and bonding the first and second substrates together such that the one of the first column spacers and the projection contact each other.

In another aspect, a method of manufacturing a liquid crystal display (LCD) device includes forming a plurality of first and second column spacers on a first substrate, forming a plurality of gate lines and gate electrodes on a second substrate, forming a gate insulating layer on an entire surface of the second substrate including the gate lines and the gate electrodes, forming a semiconductor layer on the gate insulating layer above the gate electrode, forming a plurality of data lines on the second substrate perpendicular to the gate lines to define a plurality of pixel regions and source and drain electrodes at both sides of the semiconductor layer, forming a passivation layer on the second substrate having a contact hole including the drain electrode, forming a plurality of pixel electrodes on the passivation layer, each connected to the drain electrode, forming at least one projection on the second substrate corresponding to one of the first column spacers, dispensing a liquid crystal material onto one of the first and second substrates, forming a seal pattern on one of the first and second substrates, and bonding the first and second substrates together such that the one of the first column spacers and the projection contact each other.

In another aspect, a method of manufacturing a liquid crystal display (LCD) device includes forming a plurality of first and second column spacers on a first substrate, forming a plurality of gate lines and gate electrodes on a second substrate, forming a gate insulating layer on an entire surface of the second substrate including the gate lines and the gate electrodes, forming a semiconductor layer and a first projection pattern on the gate insulating layer corresponding to the gate electrodes and the first column spacers, forming a plurality of data lines on the second substrate perpendicular to the gate lines to define a plurality of pixel regions, source and drain electrodes at both sides of the semiconductor layer, and a second projection pattern on the first projection pattern, forming a passivation layer along an entire surface of the second substrate and having a contact hole including the drain electrode, forming a plurality of pixel electrodes on the passivation layer, each connected to the drain electrode, dispensing a liquid crystal material onto one of the first and second substrates, forming a seal pattern on one of the first and second substrates, and bonding the first and second substrates together such that the one of the first column spacers and the projection contact each other.

In another aspect, a method of manufacturing a liquid crystal display (LCD) device includes forming a plurality of first and second column spacers on a first substrate, forming a plurality of gate lines each having a gate electrode, and a common line having a plurality of common electrodes, on the second substrate, forming a gate insulating layer on an entire surface of the second substrate including the gate lines and the common line, forming a semiconductor layer and a first projection pattern on the gate insulating layer corresponding to one of the gate electrodes and one of the first column spacers, forming a plurality of data lines on the second substrate perpendicular to the gate lines to define a plurality of pixel regions, source and drain electrodes at both sides of the semiconductor layer, and a second projection pattern on the first projection pattern, forming a passivation layer along an entire surface of the second substrate having a contact hole including the drain electrode, forming a plurality of pixel electrodes on the passivation layer, each connected to the drain electrode and parallel to the common electrodes within one of the pixel regions, dispensing a liquid crystal material onto on of the first and second substrates, forming a seal pattern on one of the first and second substrates, and bonding the first and second substrates together such that the one of the first column spacers and the first and second projection patterns contact each other.

In another aspect, a method of manufacturing a liquid crystal display (LCD) device includes preparing first and second substrates having a plurality of pixel regions, forming a plurality of projections on the second substrate each corresponding to one of the pixel regions, forming first and second column spacers on the first substrate within two different ones of the pixel regions at every three pixel regions, each of the first column spacers overlapping one of the projections, and each of the second column spacers not overlapping the projections, dispensing a liquid crystal material onto one of the first and second substrates, forming a seal pattern on one of the first and second substrates, and bonding the first and second substrates together such that the one of the first column spacers and the projections contact each other.

In another aspect, a method of manufacturing a liquid crystal display (LCD) device includes preparing first and second substrates, forming a gate line and a gate electrode on the second substrate, forming a gate insulating layer on an entire surface of the second substrate including the gate line and the gate electrode, forming a semiconductor layer and a first projection pattern on the gate insulating layer corresponding to the gate electrode and a predetermined portion of the gate line, forming a data line on the second substrate perpendicular to the gate line to define a pixel region, source and drain electrodes at both sides of the semiconductor layer, and a second projection pattern on the first projection pattern, forming a passivation layer on the second substrate and having a contact hole including the drain electrode, forming a pixel electrode on the passivation layer connected to the drain electrode with the pixel region, forming first and second column spacers within the first pixel region and a second pixel region at every third pixel region on the first substrate, the first column spacer overlapping one of a plurality of projections on the second substrate, and the second column spacer not overlapped by the projections, dispensing a liquid crystal material onto one of the first and second substrates, forming a seal pattern on one of the first and second substrates, and bonding the first and second substrates together such that the first column spacer overlapping the one of the plurality of projections contact each other.

In another aspect, a liquid crystal display (LCD) device includes a first substrate having a plurality of first and second column spacers, a second substrate facing the first substrate, the second substrate contacting the first column spacers, and a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 6 is a cross sectional view of an exemplary LCD device according to the present invention;

FIG. 8 is a schematic plan view of an exemplary IPS mode LCD device according to the present invention;

DETAILED DESCRIPTION OF THE PREFERRED EMBODIMENTS

Figure 1:
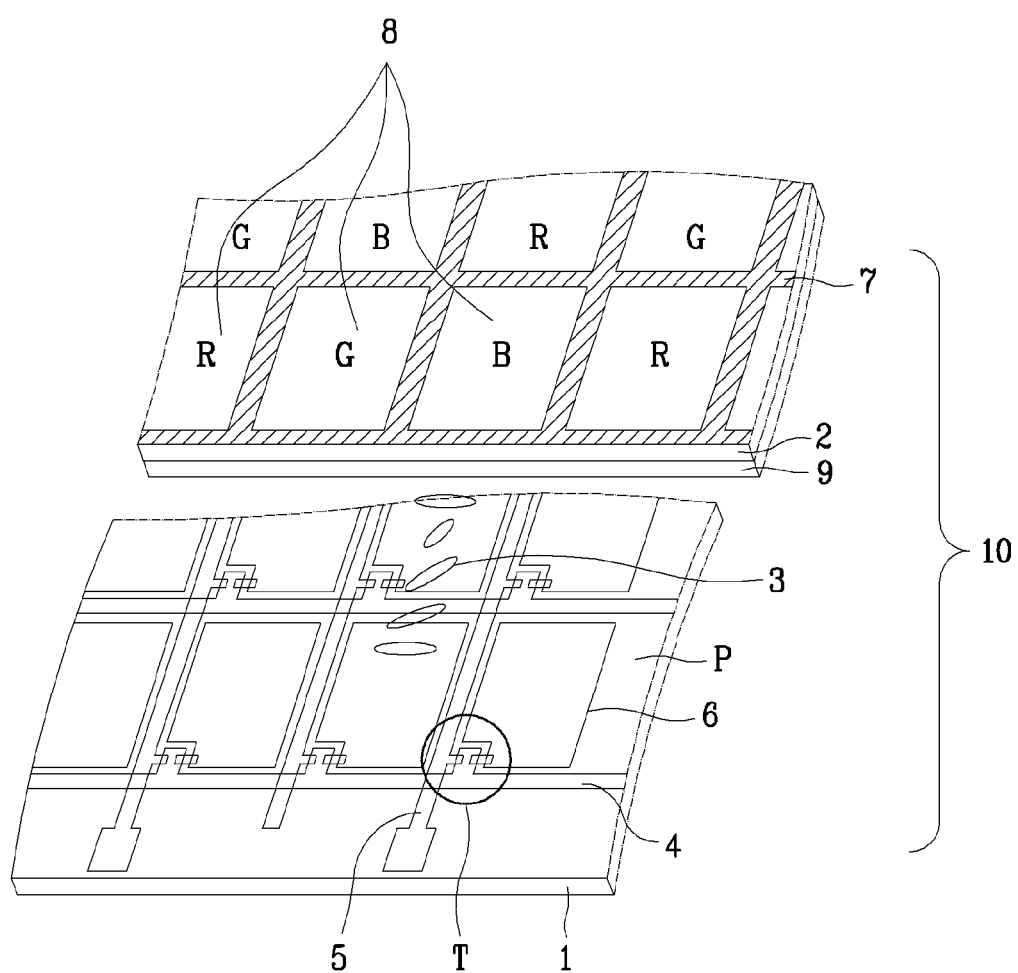
FIG. 1 is a schematic perspective view of an LCD device according to the related art.
Figure 2:
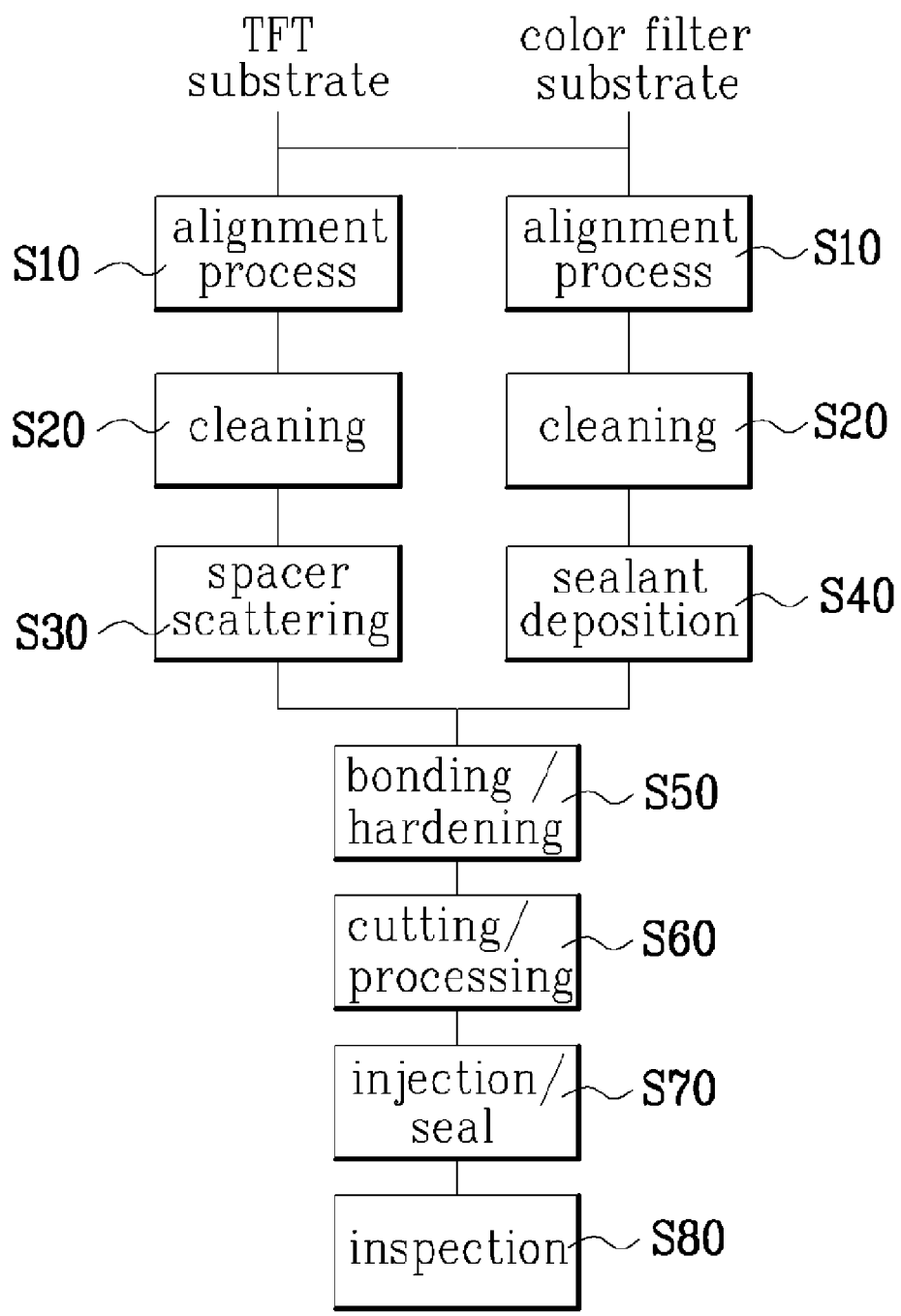
FIG. 2 is a flow chart of a method of fabricating an LCD device according to the related art.
Figure 3:
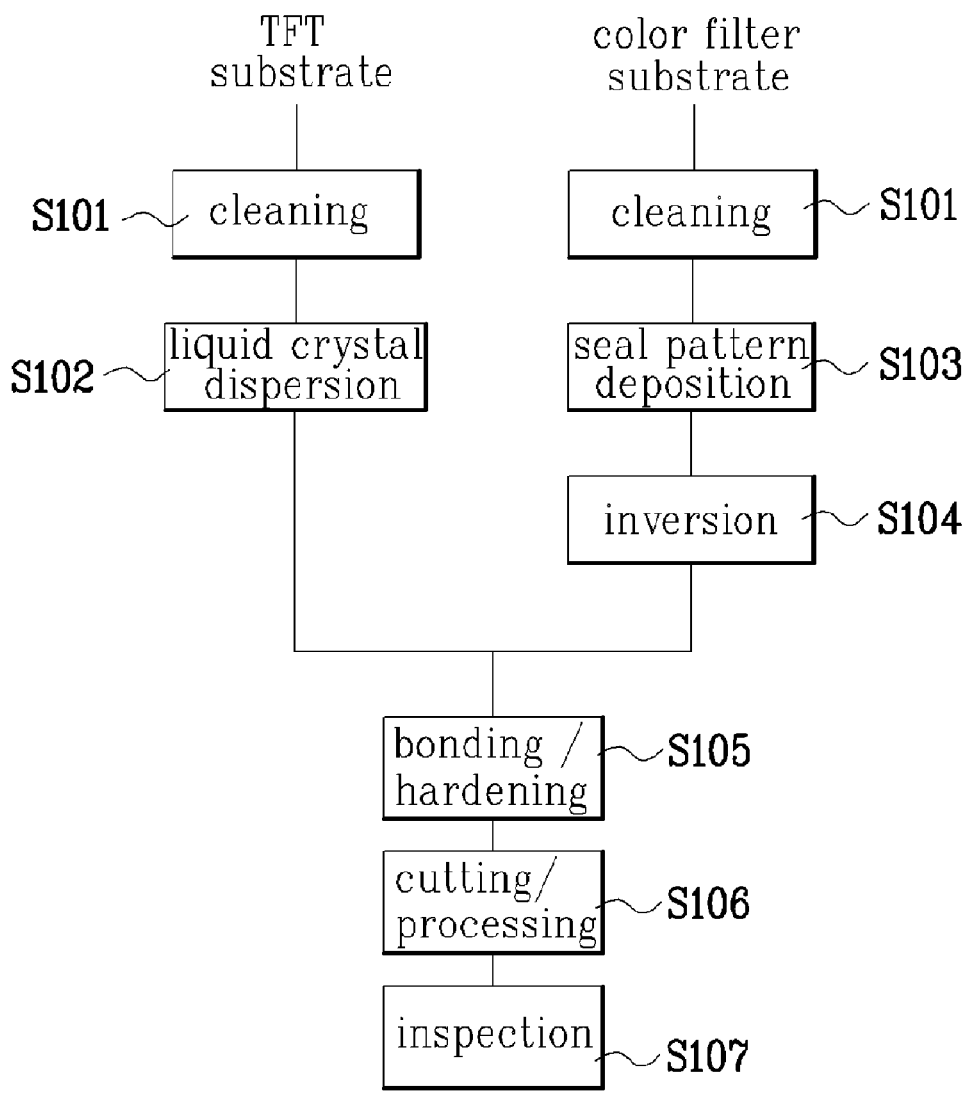
FIG. 3 is a flow chart of another method of fabricating an LCD device according to the related art.
Figure 4:
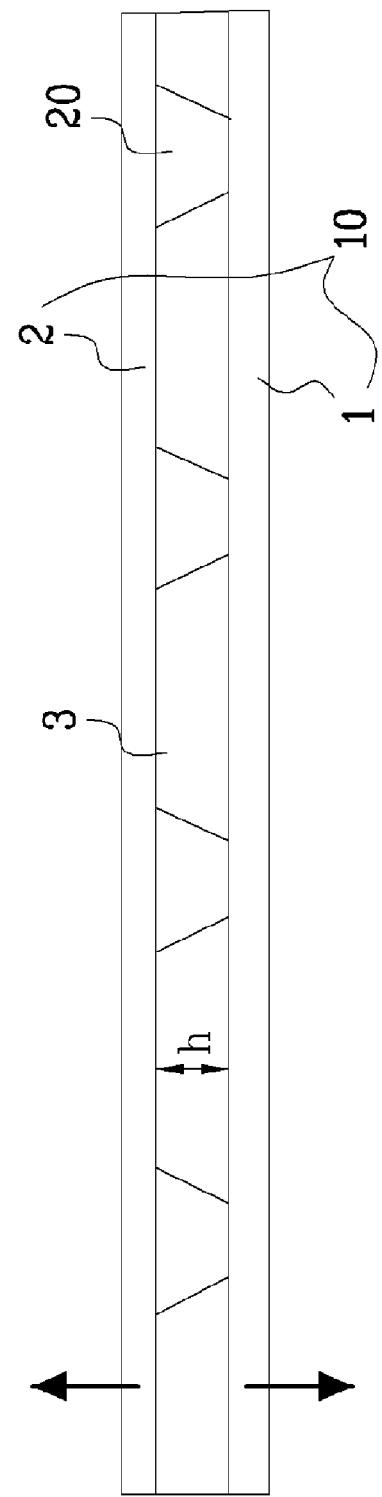
FIG. 4 is a cross sectional view of bonded TFT and color filter substrates having column spacers according to the related art.
Figure 5A:
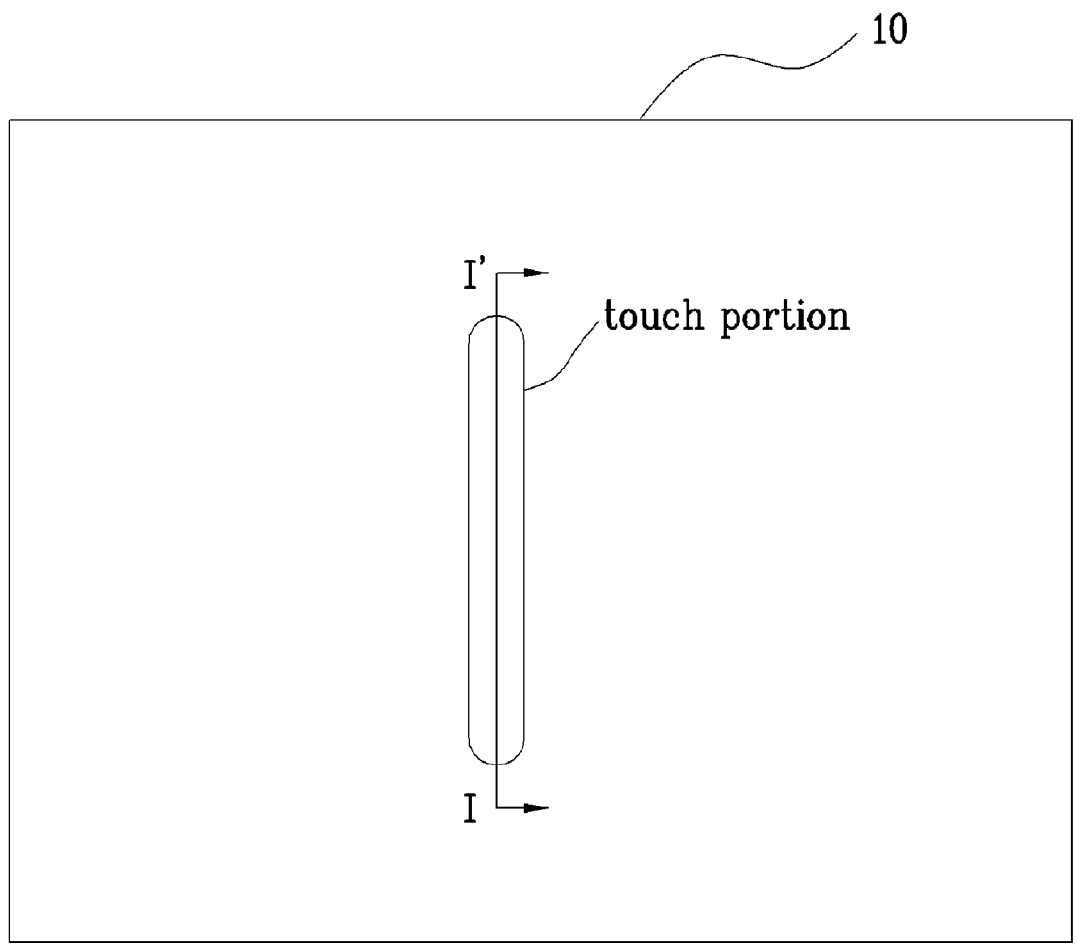
FIG. 5A is a plan view of an LCD device according to the related art.
Figure 5B:
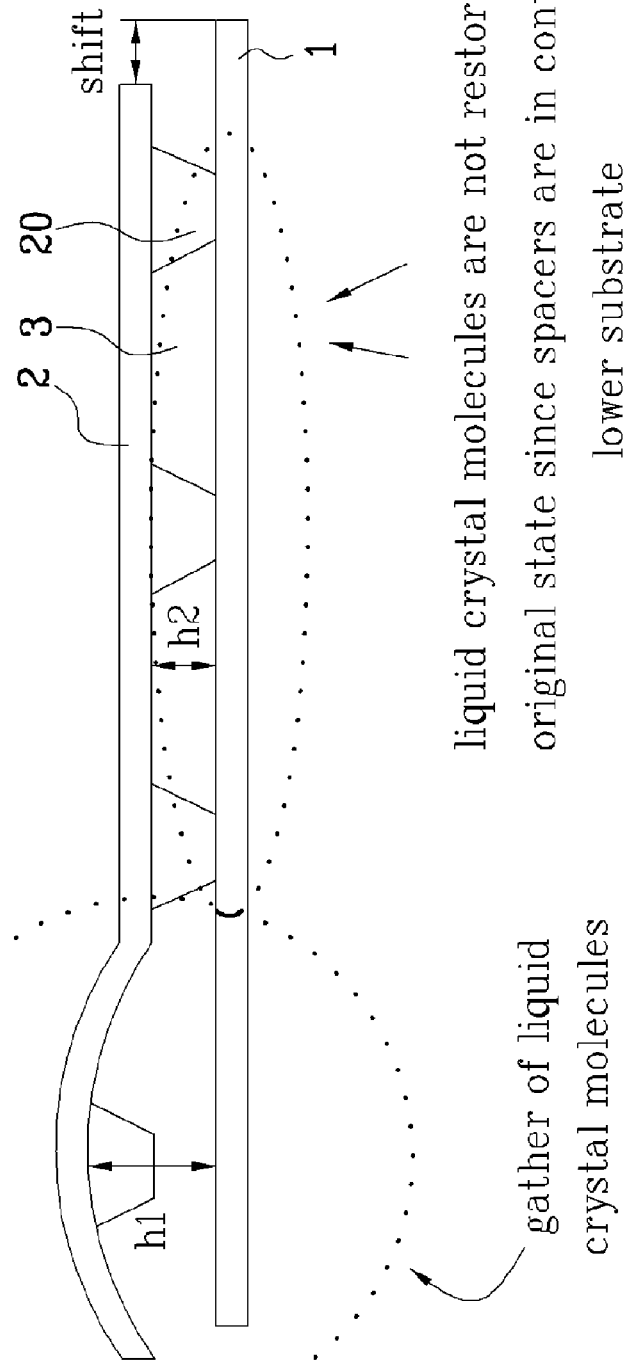
FIG. 5B is a cross sectional view along I-I' of FIG. 5A according to the related art.

Reference will now be made in detail to the preferred embodiments of the present invention, examples of which are illustrated in the accompanying drawings.

FIG. 6 is a cross sectional view of an exemplary LCD device according to the present invention. in FIG. 6, an LCD may include a color filter substrate 100, a TFT substrate 200, a liquid crystal layer (not shown), a plurality of first and second column spacers 50a and 50b, and a plurality of projections 51. In addition, the color filter substrate 100 may have a color filter array disposed thereon and the TFT substrate 200 may have a TFT array disposed thereon to oppose the color filter substrate 100, wherein the liquid crystal layer 55 may be formed between the color filter substrate 100 and the TFT substrate 200.

The plurality of first and second column spacers 50a and 50b may be formed on the color filter substrate 100 at a predetermined interval from the TFT substrate 200, and the plurality of projections 51 may be formed on the TFT substrate 200 corresponding to the plurality of first column spacers 50a. Accordingly, the plurality of projections 51 may be formed to correspond to the first column spacers 50a, thereby maintaining a uniform cell gap between the TFT substrate 200 and the color filter substrate 100. In addition, the second column spacers 50b may function as buffers for preventing formation of hollow portion within the LCD panel when the substrates of the LCD panel are pressed by an external force. Accordingly, a contact area between the projection 51 and the first column spacer 50a may be determined according to an upper surface area of the projection 51.

The first and second column spacers 50a and 50b may be formed on portions corresponding to gate or data lines of the TFT substrate 200. However, the second column spacers 50b may be formed on portions corresponding to pixel regions. Accordingly, a surface area of the projection 51 may be relatively smaller than a surface area of the first column spacer 50a. For example, a surface area of the first column spacer 50a may have a first area contacting the projection 51 and a second area not contacting the projection 51.

Figure 7A:
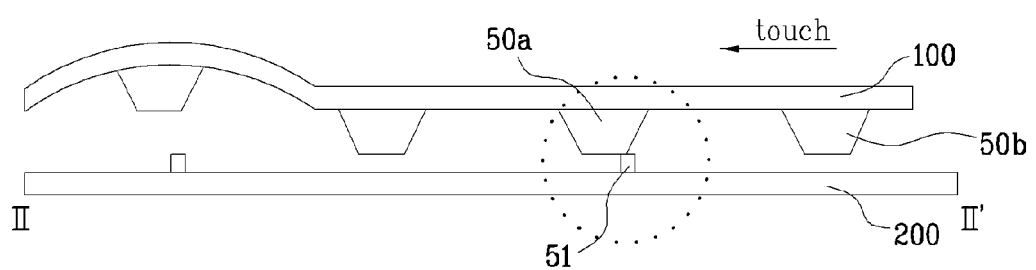
FIGS. 7A and 7B are cross sectional views of another exemplary LCD device according to the present invention.
Figure 7B:
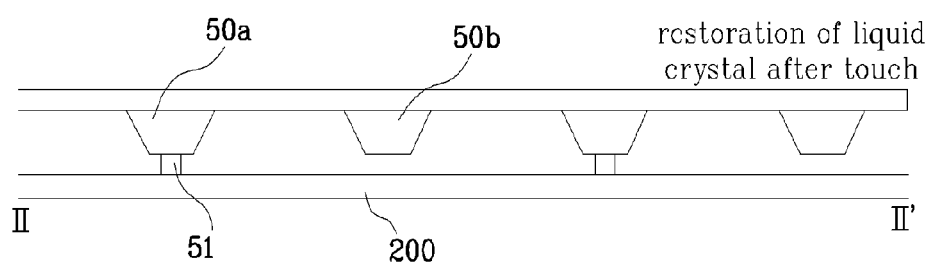

FIGS. 7A and 7B are cross sectional views of another exemplary LCD device according to the present invention, wherein FIG. 7A and FIG. 7B illustrate changes of an LCD device upon a touch contact and after a touch contact. In FIG. 7A, when the LCD panel is touched, the contact area between the first column spacer 50a and the projection 51 may decrease, thereby reducing frictional forces therebetween. After touching, liquid crystal molecules may be rapidly restored to an original state, as shown in FIG. 7B. Thus, the liquid crystal molecules may be prevented from migrating into the touch portion, thereby preventing light leakage and obtaining uniform light luminance along an entire LCD panel.

Figure 9:
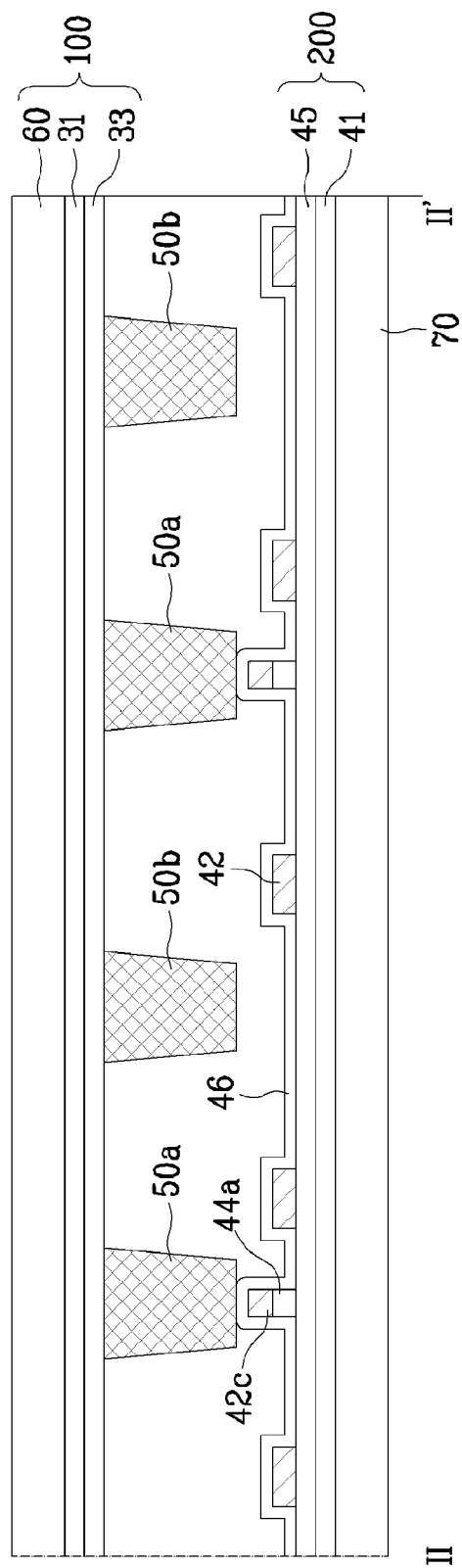
FIG. 9 is a cross sectional view along II-II' of FIG. 8 according to the present invention.

FIG. 8 is a schematic plan view of an exemplary IPS mode LCD device according to the present invention, and FIG. 9 is a cross sectional view along II-II' of FIG. 8 according to the present invention. In FIGS. 8 and 9, a color filter substrate 100 and a TFT substrate 200 may be bonded to each other at a predetermined interval therebetween, and a liquid crystal layer (not shown) may be formed between the color filter substrate 100 and the TFT substrate 200 by an injection method. The color filter substrate 100 may include a black matrix layer 31, an R/G/B color filter layer (not shown), and an overcoat layer 33, all formed on a glass substrate 60. The black matrix layer 31 may exclude light from portions corresponding to gate and data lines and thin film transistors, except at respective pixel regions. The color filter layer (not shown) may be formed to produce various colored light at the portions corresponding to the respective pixel regions, and the overcoat layer 33 may be formed along an entire surface of the black matrix layer 31 and the color filter layer.

Then, first and second column spacers 50a and 50b may be formed of photosensitive resin on the predetermined portions of the overcoat layer 33. Next, the TFT substrate 200 may be disposed to oppose the color filter substrate 100. The TFT substrate 200 may include a plurality of gate lines 41 and a plurality of data lines 42, all formed on a glass substrate 70. In addition, the gate and data lines 41 and 42 may be formed perpendicular to each other, thereby defining the pixel regions. Moreover, a common line 47 may be formed in parallel to the gate lines 41, and a plurality of common electrodes 47a may extend from the common line 47 to the pixel regions and may be formed at fixed intervals. Furthermore, a thin film transistor TFT may be formed at each crossing portion of the gate and data lines 41 and 42, and may include source and drain electrodes 42a and 42b.

Then, a plurality of pixel electrodes 43 may be formed between and parallel to the common electrodes 47a, wherein each of the pixel electrodes 43 may be connected to the drain electrode 42b of the TFT. In addition, the projections 51 (in FIGS. 7A and 7b) extending from a semiconductor layer 44 and the data line 42 may be formed above the gate line 41 corresponding to the first column spacer 50a.

An exemplary method of fabricating the TFT, the pixel electrodes, and the projections may include deposition of a metal material, such as Mo, Al, or Cr, along an entire surface of the glass substrate 70 by a sputtering method, and may be patterned by photolithographic processes, thereby simultaneously forming the plurality of gate lines 41, a gate electrode 41a projecting from the gate line 41, the common line 47, and the common electrode 47a.

Subsequently, an insulating material of $SiN_x$ may be deposited along the entire surface of the glass substrate 70 including the gate lines 41, thereby forming a gate insulating layer 45. Then, the semiconductor layer 44 may be deposited on the gate insulating layer 45 and patterned to form a first projection pattern 44a for forming the projection on the gate insulating layer 45 corresponding to the first column spacer 50a. For example, an amorphous silicon layer (or polysilicon layer) and a heavily doped silicon layer may be sequentially deposited and simultaneously patterned, thereby forming the semiconductor layer 44. After that, a metal material, such as Mo, Al, or Cr, may be deposited along the entire surface of the glass substrate 70 by a sputtering method and patterned by photolithographic processes, thereby forming the data line 42 perpendicular to the gate line 41.

Then, the source and drain electrodes 42a and 42b may be formed at both sides of the semiconductor layer 44, and a second projection pattern 42c may be formed on the first projection pattern 44a. Accordingly, the source electrode 42a may project from the data line 42. When patterning the source and drain electrodes 42a and 42b, a portion of the doped silicon layer between the source electrode 42a and the drain electrode 42b may be removed. Thus, the projection 51 may be formed of the first and second projections patterns 44a and 42c.

Subsequently, a passivation layer 46 of $SiN_x$ may be formed along the entire surface of the glass substrate 70 including the source electrode 42a and the drain electrode 42b using a chemical vapor deposition (CVD) method. Alternatively, the passivation layer 46 may be formed of an organic material having a low dielectric constant, such as BenzoCycloButene (BCB), Spin On Glass (SOG,) or acryl, to improve an aperture ratio of liquid crystal cell. Then, the passivation layer 46 may be selectively etched on the drain electrode 42b, thereby forming a contact hole exposing a predetermined portion of the drain electrode 42b. Also, a transparent conductive layer may be formed on the passivation layer 46 to be connected to the drain electrode 42b through the contact hole by sputtering. Then, the transparent conductive layer may be selectively removed to form the pixel electrode 43 connected to the drain electrode 42b between and parallel to the common electrodes 47a.

In FIGS. 8 and 9, the projections 51 may not be formed at portions corresponding to the second column spacer 50b. Although not shown, first and second alignment layers may be formed on the color filter substrate 100 having the column spacers 50a and 50b, and on the TFT substrate 200 having the projection 51, respectively, wherein a rubbing process may be performed thereto. When rubbing the color filter and TFT substrates 100 and 200, the surfaces of the first and second alignment layers may be rubbed with a cloth at a constant pressure and speed. Thus, polymer chains of the alignment layers may be aligned along a predetermined direction, thereby determining an initial alignment direction of liquid crystal molecules of the liquid crystal layer.

At this time, the upper surface of the projection 51 is relatively smaller than the lower surface of the first column spacer 50a. The projection 51 is formed at the portion corresponding to the first column spacer 50a to decrease the contact area between the first column spacer and structures formed on the TFT substrate 200 when the screen of the LCD device is touched along one direction. Thus, it is possible to improve the restoring force of the liquid crystal by decreasing the frictional force between the first column spacer and the structures formed on the TFT substrate.

Accordingly, the TFT substrate 200 corresponding to the first column spacer 50a may have a vertical deposition structure including the substrate 70, the gate line 41, the gate insulating layer 45, the first projection pattern 44a of the semiconductor layer, the second projection pattern 42c formed of the same material as the data line, and the passivation layer 46. In addition, the TFT substrate 200 corresponding to the second column spacer 50b may have a vertical deposition structure including the substrate 70, the gate line 41, the gate insulating layer 45, and the passivation layer 46. Thus, an entire surface of the first column spacer 50 may not contact the projection 51. For example, the surface area of the first column spacer 50a may be divided into first and second areas, wherein the first area may contact the projection 51 and the second area may not contact the projection 51.

At this time, the TFT substrate 200 corresponding to the first area may have a vertical deposition structure including the substrate 70, the gate line 41, the gate insulating layer 45, the first projection pattern 44a of the semiconductor layer, the second projection pattern 42c formed of the same material as the data line, and the passivation layer 46. In addition, the TFT substrate 200 corresponding to the second area may have a vertical deposition structure including the substrate 70, the gate line 41, the gate insulating layer 45, and the passivation layer 46. Accordingly, a step difference of about 500 Å or more may exist between the surfaces of the TFT substrate 200 corresponding to the first column spacer 50a and the second column spacer 50b. Similarly, a step difference of about 500 Å or more may exist between the surfaces of the TFT substrate 200 corresponding to the first and second areas.

In FIG. 9, the color filter substrate 100 may include the column spacers 50a and 50b, and the TFT substrate 200 may include the projections 51. Alternatively, the column spacers may be formed on the TFT substrate, and the projections 51 may be formed on the color filter substrate.

In FIGS. 8 and 9, the first and second column spacers 50a and 50b may be alternately formed within the pixel regions, and each of the projections 51 may be formed at portions corresponding to the first column spacer 50a. Alternatively, the first or second column spacers 50a or 50b may be formed within every two pixel regions, and the projection 51 may be formed at portions corresponding to the first column spacer 50a.

Figure 10:
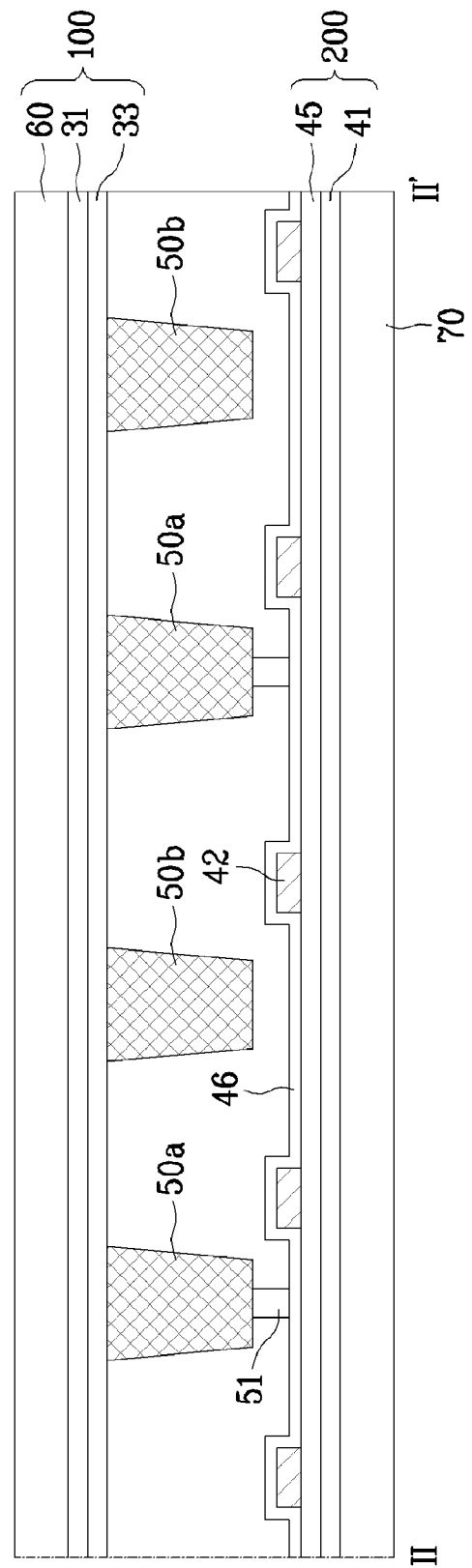
FIG. 10 is a cross sectional view along II-II' of FIG. 8 according to the present invention.

FIG. 10 is a cross sectional view along II-II' of FIG. 8 according to the present invention. In FIGS. 8 and 10, an LCD device may include a color filter substrate 100 and a TFT substrate 200 bonded at a predetermined interval therebetween, and a liquid crystal layer (not shown) may be formed by injecting a liquid crystal material between the color filter substrate 100 and the TFT substrate 200.

The color filter substrate 100 may include a black matrix layer 31, an R/G/B color filter layer (not shown), and an overcoat layer 33, all formed on a glass substrate 60. The black matrix layer 31 may exclude light from portions corresponding to gate and data lines and thin film transistors, except for pixel regions. The color filter layer (not shown) may produce various colored light at the portions corresponding to the respective pixel regions, and the overcoat layer 33 may be formed along an entire surface of the black matrix layer 31 and the color filter layer.

Then, first and second column spacers 50a and 50b may be formed on predetermined portions of the overcoat layer 33, wherein the first and second column spacers 50a and 50b may be formed of photosensitive resin.

Then, the TFT substrate 200 including a plurality of gate lines 41 and a plurality of data lines 42 may be formed to oppose the color filter substrate 100, wherein the gate and data lines 41 and 42 may cross each other to define a plurality of the pixel regions. In addition, a common line 47 may be formed in parallel to the gate lines 41, and a plurality of common electrodes 47a, which may extend from the common line 47 toward the pixel regions, may be formed at fixed intervals.

Then, a thin film transistor TFT may be formed at each of the crossing regions of the gate and data lines 41 and 42, wherein the TFT may include source and drain electrodes 42a and 42b.

Next, a plurality of pixel electrodes 43 may be formed between and in parallel to the common electrodes 47a, wherein each of the pixel electrodes 43 may be connected to the drain electrode 42b of the TFT. In addition, a projection 51 may be formed on the TFT substrate 200 corresponding to the first column spacer 50a.

An exemplary method of fabricating the thin film transistor, the pixel electrode, and the projection may include deposition of a metal material, such as Mo, Al, or Cr, along an entire surface of the glass substrate 70, and patterning by photolithographic processes, thereby simultaneously forming the plurality of gate lines 41, a gate electrode 41a extending from the gate line 41, the common line 47, and the common electrode 47a.

Subsequently, a gate insulating layer 45 may be formed by depositing an insulating material of $SiN_x$ along the entire surface of the glass substrate 70 including the gate lines 41. Then, a semiconductor layer 44 may be formed on the gate insulating layer 45 above the gate electrode 41a. For example, an amorphous silicon layer (or polysilicon layer) and a heavily doped silicon layer may be sequentially deposited and simultaneously patterned, thereby forming the semiconductor layer 44.

Next, a metal material, such as Mo, Al, or Cr, may be deposited along the entire surface of the glass substrate 70 by a sputtering method, and patterned by photolithographic processes, thereby forming the data line 42 perpendicular to the gate line 41.

Then, source and drain electrodes 42a and 42b may be formed at both sides of the semiconductor layer 44, wherein the source electrode 42a may project from the data line 42. When patterning the source and drain electrodes 42a and 42b, a portion of the doped silicon layer between the source electrode 42a and the drain electrode 42b may be removed.

Next, a passivation layer 46 of $SiN_x$ may be formed along the entire surface of the substrate including the source electrode 42a and the drain electrode 42b using a CVD method. Alternatively, the passivation layer 46 may be formed of an organic material having a low dielectric constant, such as BCB, SOG, or acryl, to improve an aperture ratio of the liquid crystal cell. Then, the passivation layer 46 may be selectively etched on the drain electrode 42b, thereby forming a contact hole exposing a predetermined portion of the drain electrode 42b. In addition, a transparent conductive layer may be formed on the passivation layer 46 to be connected to the drain electrode 42b through the contact hole by a sputtering method. Then, the transparent conductive layer may be selectively removed to form the pixel electrode 43 connected to the drain electrode 42b and to be formed in between and in parallel to the common electrodes 47a.

Then, the projections 51 may be formed on the color filter substrate 100 corresponding to the first column spacer 50a by depositing the same material as the column spacer on the passivation layer 46, and selectively removing the deposited material.

Although not shown, first and second alignment layers may be formed on the color filter substrate 100 and the TFT substrate 200, respectively, and then a rubbing process may be performed thereto. During rubbing of the color filter and TFT substrates 100 and 200, the surfaces of the alignment layers may be rubbed with a cloth at a uniform pressure and speed. Thus, polymer chains of the alignment layers may be aligned along a predetermined direction, thereby determining an initial alignment direction of the liquid crystal material.

Accordingly, an upper surface of the projection 51 may be relatively smaller than a lower surface of the first column spacer 50a. In addition, the projection 51 may be formed at a portion corresponding to the first column spacer 50a to reduce a contact surface between the first column spacer and structures formed on the TFT substrate 200 when a screen of the LCD device is touched along one direction. Accordingly, a restoring force of the liquid crystal material may be increased, and frictional forces between the first column spacer 50a and the structures formed on the TFT substrate 200 may be reduced.

According to the present invention, column spacers may be formed on a color filter substrate, and projections may be formed on a TFT substrate. Alternatively, the column spacers may be formed on the TFT substrate, and the projections may be formed on the color filter substrate. In FIG. 10, the projections 51 may be additionally formed corresponding to the first column spacer 50a, thereby requiring an additional process.

In addition, as shown in FIG. 10, the first and second column spacers 50a and 50b may be alternately formed within the pixel regions, and the projections 51 may be formed at portions corresponding to the first column spacer 50a. Alternatively, the first or second column spacers 50a or 50b may be alternately formed within every two pixel regions, and the projections 51 may be formed at portions corresponding to the first column spacer 50a. Thus, a step difference of about 500 Å or more may exist between the surfaces of the TFT substrate 200 corresponding to the first column spacer 50a and the second column spacer 50b. Similarly, a step difference of about 500 Å or more may exist between the surfaces of the TFT substrate 200 corresponding to the first and second areas.

Figure 11:
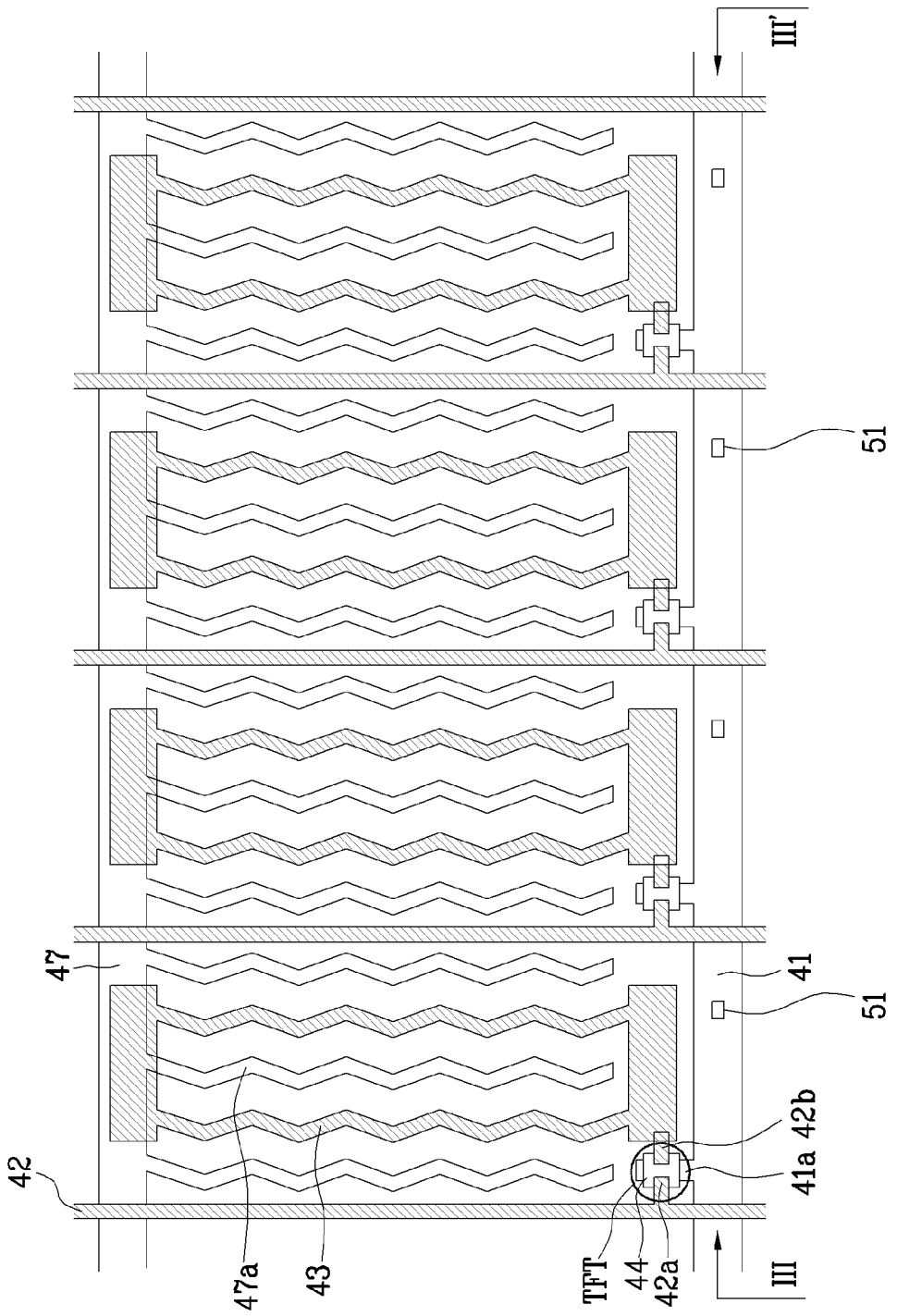
FIG. 11 is a plan view of an exemplary TFT substrate according to the present invention.
Figure 12:
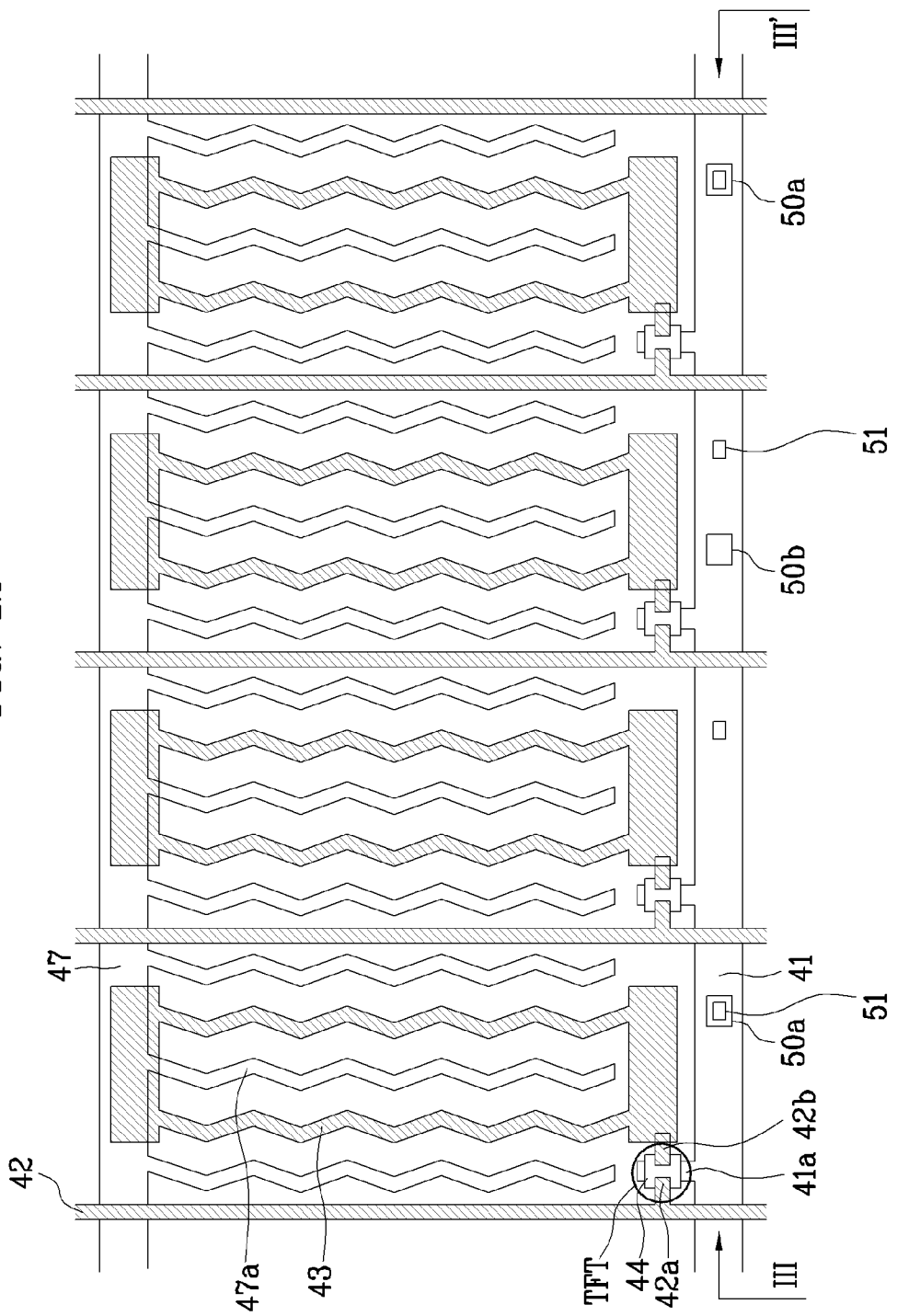
FIG. 12 is a plan view of an exemplary LCD device according to the present invention.
Figure 13:
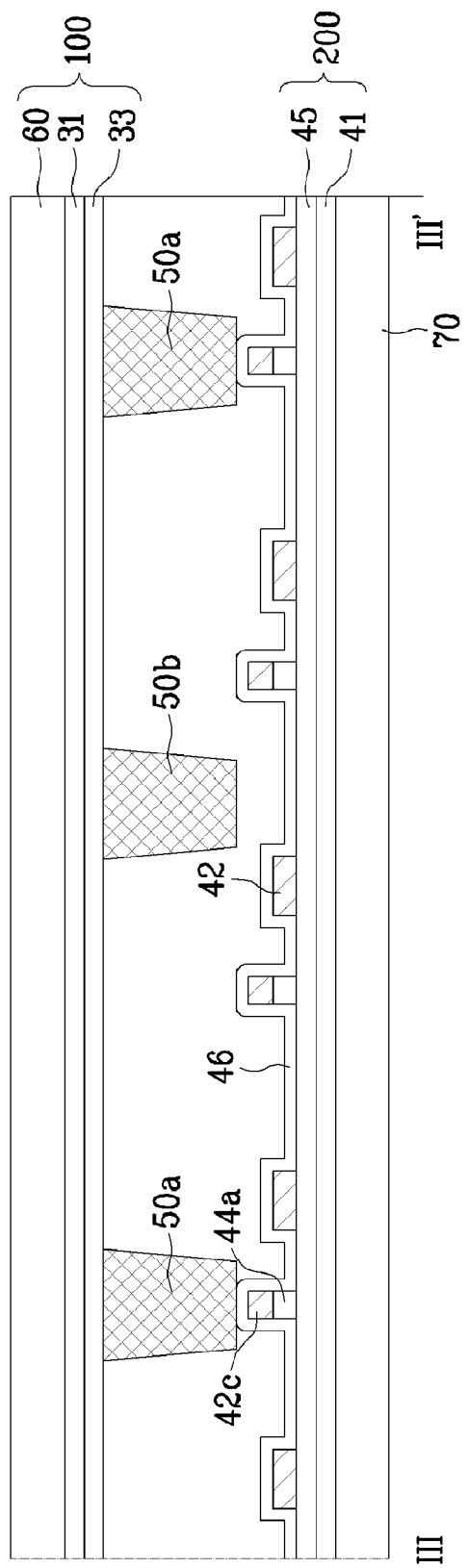
FIG. 13 is a cross sectional view along III-III' of FIG. 12 according to the present invention.

FIG. 11 is a plan view of an exemplary TFT substrate according to the present invention, FIG. 12 is a plan view of an exemplary LCD device according to the present invention, and FIG. 13 is a cross sectional view along III-III' of FIG. 12 according to the present invention. In FIGS. 11, 12, and 13, an LCD device may include a color filter substrate 100 and a TFT substrate 200 bonded at a predetermined interval therebetween, and a liquid crystal layer (not shown) may be formed by injecting a liquid crystal material between the color filter substrate 100 and the TFT substrate 200.

The color filter substrate 100 may include a black matrix layer 31, an R/G/B color filter layer (not shown), and an overcoat layer 33, all formed on a glass substrate 60, wherein the black matrix layer 31 may exclude light from portions corresponding to gate and data lines and thin film transistors, except for pixel regions. The color filter layer (not shown) may produce various colored light at the portions corresponding to the pixel regions, and the overcoat layer 33 may be formed along an entire surface of the black matrix layer 31 and the color filter layer.

Then, first and second column spacers 50a and 50b may be formed on predetermined portions of the overcoat layer 33, and may be formed of photosensitive resin. Next, the two column spacers of the first and second column spacers 50a and 50b may be formed within the two pixel regions at every third pixel region. For example, the first column spacer 50a may be formed within a first pixel region among the three pixel regions, and the second column spacer 50b may be formed within another one of the three pixel regions. More specifically, the first column spacer 50a may be formed in the pixel region corresponding to a red color, the second column spacer 50b may be formed within a pixel region corresponding to a blue color, and the pixel region corresponding to green color may have no column spacer therein. The column spacers may be formed at fixed intervals.

The TFT substrate 200 may include a plurality of gate lines 41 and a plurality of data lines 42 that cross each other to define a plurality of the pixel regions. In addition, a common line 47 may be formed in parallel to the gate line, and a plurality of common electrodes 47a, which may extend from the common line 47 to the pixel regions, may be formed at fixed intervals. Then, a thin film transistor TFT may be formed at each of the crossing regions of the gate and data lines 41 and 42, and may including source and drain electrodes 42a and 42b.

Next, a plurality of pixel electrodes 43 may be formed between and parallel to the common electrodes 47a, and each of the pixel electrodes 43 may be connected to the drain electrode 42b of the TFT. In addition, a projection 51 may be formed on the gate line 41 within each of the pixel regions, wherein the projections 51 may be formed of a first projection pattern 44a and a second projection pattern 42c. Moreover, some projections 51 may overlap with the first column spacer 50a, and some projections 51 may not overlap with the second column spacers 50b. The upper surfaces of each of the projections 51 may be relatively smaller than lower surfaces of the first column spacer 50a.

An exemplary method of fabricating the TFT, the pixel electrode, and the projection may include deposition of a metal material, such as Mo, Al, or Cr, along an entire surface of the glass substrate 70 by a sputtering method, and patterning by photolithographic processes, thereby forming the plurality of gate lines 41, a gate electrode 41a that extends from the gate line 41, the common line 47 and the common electrode 47a.

Subsequently, a gate insulating layer 45 may be formed by depositing an insulating material of $SiN_x$ along the entire surface of the glass substrate 70 including the gate lines 41. Then, the semiconductor layer 44 may be deposited on the gate insulating layer 45, and patterned to form the first projection pattern 44a for forming the projection 51 on the gate insulating layer 45 within each of the pixel regions. The first projection pattern 44a may be formed to overlap the first column spacer 50a within one pixel region among at least three pixel regions. For example, an amorphous silicon layer (or polysilicon layer) and a heavily doped silicon layer may be sequentially deposited, and then simultaneously patterned, thereby forming the semiconductor layer 44.

Next, a metal material, such as Mo, Al, or Cr, may be deposited along the entire surface of the glass substrate 70 by a sputtering method, and patterned by photolithographic processes, thereby forming the data line 42 perpendicular to the gate line 41. Then, the source and drain electrodes 42a and 42b may be formed at both sides of the semiconductor layer 44, and the second projection pattern 42c is formed on the first projection pattern 44a. Accordingly, the source electrode 42a may project from the data line 42. When patterning the source and drain electrodes 42a and 42b, a portion of the doped silicon layer between the source electrode 42a and the drain electrode 42b may be removed. Thus, the projections 51 may be formed by the first and second projections patterns 44a and 42c.

Subsequently, a passivation layer 46 of $SiN_x$ may be formed along the entire surface of the TFT substrate 70 including the source electrode 42a and the drain electrode 42b using a CVD method. Alternatively, the passivation layer 46 may be formed of an organic material having a low dielectric constant, such as BCB, SOG, or acryl, to improve an aperture ratio of the liquid crystal cell. Then, the passivation layer 46 may be selectively etched on the drain electrode 42b, thereby forming a contact hole exposing a predetermined portion of the drain electrode 42b. In addition, a transparent conductive layer may be formed on the passivation layer 46 to be electrically connected to the drain electrode 42b through the contact hole. Then, the transparent conductive layer may be selectively removed to form the pixel electrode 43 connected to the drain electrode 42b, and formed in between and parallel to the common electrodes 47a.

Although not shown, first and second alignment layers may be formed on the color filter substrate 100 having the column spacers 50a and 50b, and the TFT substrate 200 having the projections 51, respectively, and then a rubbing process may be performed thereto. When rubbing the color filter and TFT substrates 100 and 200, the surfaces of the alignment layers may be rubbed with a cloth at a uniform pressure and speed. Thus, polymer chains of the alignment layers may be aligned along a predetermined direction, thereby determining an initial alignment direction of liquid crystal molecules of the liquid crystal layer.

According to the present invention, column spacers may be formed on a color filter substrate and projections may be formed on a TFT substrate. Alternatively, the column spacers may be formed on the TFT substrate and the projections may be formed on the color filter substrate. Furthermore, the projections may be formed on a passivation layer.

According to the present invention, a projection may be formed at a portion corresponding to a first column spacer. During formation of the projection, spots may be generated at a contact area between a first column spacer and the projection, thereby making it problematic in maintaining a uniform cell gap. In order to overcome this problem, if a size of the projection is increased, the contact area increases between the projection and the first column spacer. Accordingly, at least two projections may be formed at the portion corresponding to the first column spacer to decrease a contact pressure due to the increase of the contact area between the projection and the first column spacer.

Figure 14:
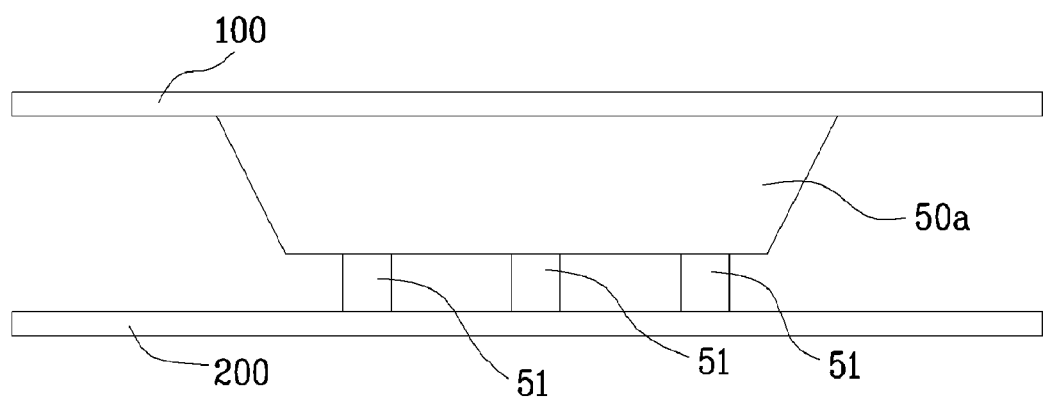
FIG. 14 is a cross sectional view of another exemplary LCD device according to the present invention.

FIG. 14 is a cross sectional view of another exemplary LCD device according to the present invention. The exemplary LCD device FIG. 14 may include materials and structures similar to those of FIGS. 8-13, whereby detailed explanation of the common structure has been omitted for the sake of brevity. In FIG. 14, an LCD device may include a color filter substrate 100 and a TFT substrate 200, wherein a first column spacer 50a and a second column spacers 50b (not shown) may be formed on the color filter substrate 100, and at least two projections 51 may be formed on the TFT substrate 200 corresponding to the first column spacer 50a. In addition, as previously described, at least two projections 51 may be formed of materials from a semiconductor layer and a data line on a gate insulating layer. Alternatively, at least two projections 51 may be formed on a passivation layer.

Figure 15:
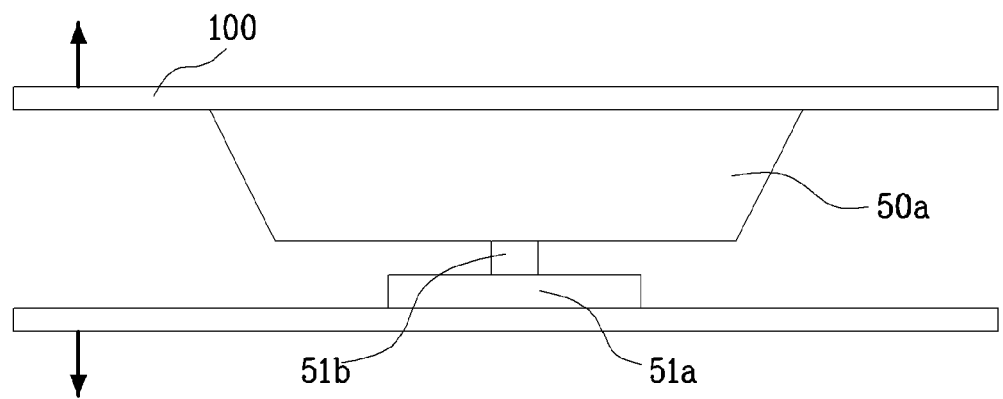
FIG. 15 is a cross sectional view of another exemplary LCD device according to the present invention.

FIG. 15 is a cross sectional view of another exemplary LCD device according to the present invention. The exemplary LCD device FIG. 15 may include materials and structures similar to those of FIGS. 8-13, whereby detailed explanation of the common structure has been omitted for the sake of brevity. In FIG. 15, an LCD device may include a first projection pattern 51a and a second projection pattern 51b, wherein the first and second projection patterns 51a and 51b may have different sizes and may both be formed on a TFT substrate 200. In addition, the second projection pattern 51b corresponding to a first column spacer 50a may be relatively smaller than the first projection pattern 51a, thereby reducing frictional forces by decreasing a contact area between the first column spacer 50a and the second projection pattern 51b and preventing effects of spots due to touch contact.

The first and second projection patterns 51a and 51b may be formed of the same material, and may include materials from a semiconductor layer and a data line formed upon a gate insulating layer. Alternatively, the first and second projection patterns 51a and 51b may be formed on a passivation layer.

Figure 16:
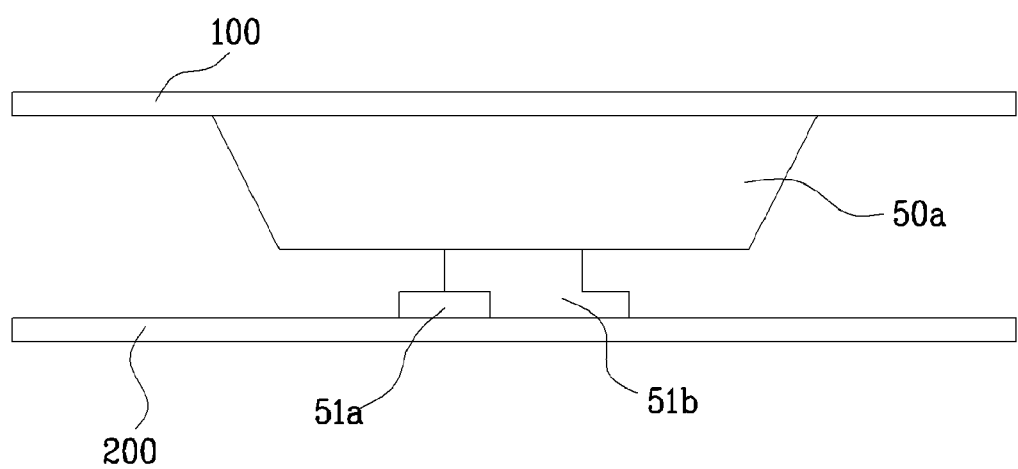
FIG. 16 is a cross sectional of another exemplary LCD device according to the present invention.

FIG. 16 is a cross sectional of another exemplary LCD device according to the present invention. The exemplary LCD device FIG. 16 may include structures and materials similar to those of FIGS. 8-13, whereby detailed explanation of the common structure has been omitted for the sake of brevity. In FIG. 16, a first projection pattern 51a may be formed on a TFT substrate 200 corresponding to a first column spacer 50a of a color filter substrate 100. Then, a second projection pattern 51b may be formed on the TFT substrate 200 to partially overlap the first projection pattern 51a. Accordingly, a contact area between the first column spacer 50a and the projection may be determined by an upper surface of the second projection pattern 51b. Thus, as an upper surface of the second projection pattern 51b is reduced, frictional forces between the upper surface of the second projection pattern 51b and the first column spacer 50a may decrease, thereby minimizing formation of spots due to touch contact.

When the upper surface of the first column spacer 50a is touched, an applied pressure load effects the first and second projection patterns 51a and 51b. Thus, as compared with a structure of forming one projection having a relatively smaller size than that of the first column spacer, deformation of the column spacer may be prevented. Alternatively, the first and second projection patterns 51a and 51b may be formed on a passivation layer.

Figure 17:
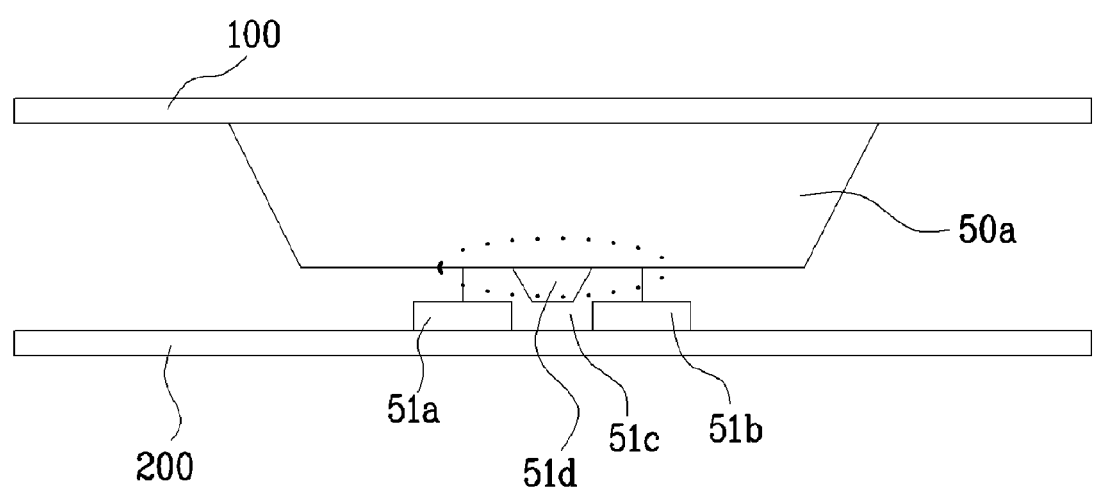
FIG. 17 is a cross sectional view of another exemplary LCD device according to the present invention.

FIG. 17 is a cross sectional view of another exemplary LCD device according to the present invention. The exemplary LCD device FIG. 17 may include structures and materials similar to those of FIGS. 8-13, whereby detailed explanation of the common structure has been omitted for the sake of brevity. In FIG. 17, a first organic insulating layer may be deposited on a TFT substrate 200, and then patterned to form first and second projection patterns 51a and 51b at a predetermined interval from each other.

Next, a second insulating layer may be formed along an entire surface of the TFT substrate 200 including the first and second projection patterns 51a and 51b, and then patterned to form a third projection pattern 51c contacting a first column spacer 50a. In addition, the third projection pattern 51c may partially overlap the first and second projection patterns 51a and 51b. Accordingly, although there may be misalignment when patterning the first and second organic insulating layers for forming the first and second projection patterns 51a and 51b, a contact area between the first column spacer 50a and the third projection pattern 51c may remain constant since the first and second organic insulating layers may be formed of the same thickness.

In addition, the third projection pattern 51c may include a groove 51d therein according to a step difference created by the first and second projection patterns 51a and 51b, thereby reducing a contact area between the third projection pattern 51c and the first column spacer 50a. Alternatively, the projection patterns 51a, 51b, and 51c may be formed on a passivation layer.

Figure 18:
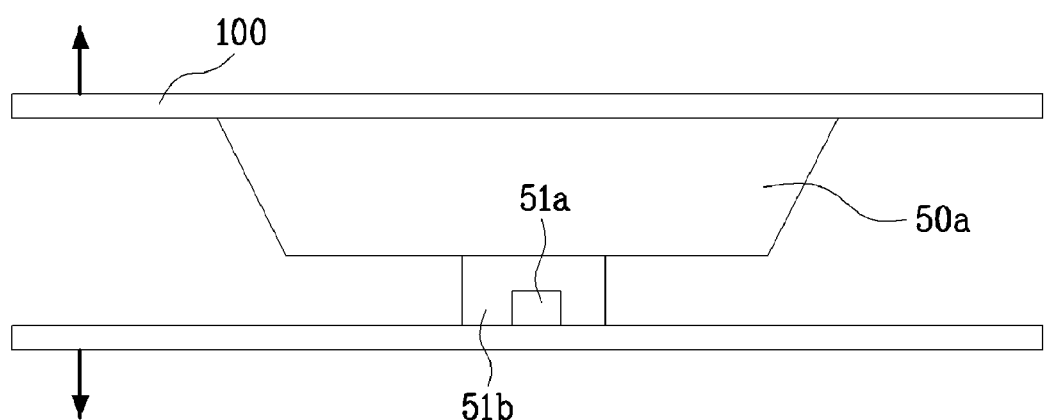
FIG. 18 is a cross sectional view of another exemplary LCD device according to the present invention.

FIG. 18 is a cross sectional view of another exemplary LCD device according to the present invention. The exemplary LCD device FIG. 18 may include structures and materials similar to those of FIGS. 8-13, whereby detailed explanation of the common structure has been omitted for the sake of brevity. In FIG. 18, an LCD device may include a projection having a first projection pattern 51a and a second projection pattern 51b, wherein the first and second projection patterns 51a and 51b may have different sizes. For example, the first projection pattern 51a may be smaller than the second projection pattern 51b, whereby the first projection pattern 51a may be covered by the second projection pattern 51b and may be formed of the same material. Alternatively, the first and second projection patterns 51a and 51b may be formed on a passivation layer.

According to the present invention, although the structures of FIG. 8-18 may be applied in IPS mode LCD devices, they may also be applied in TN mode LCD devices.

Figure 19:
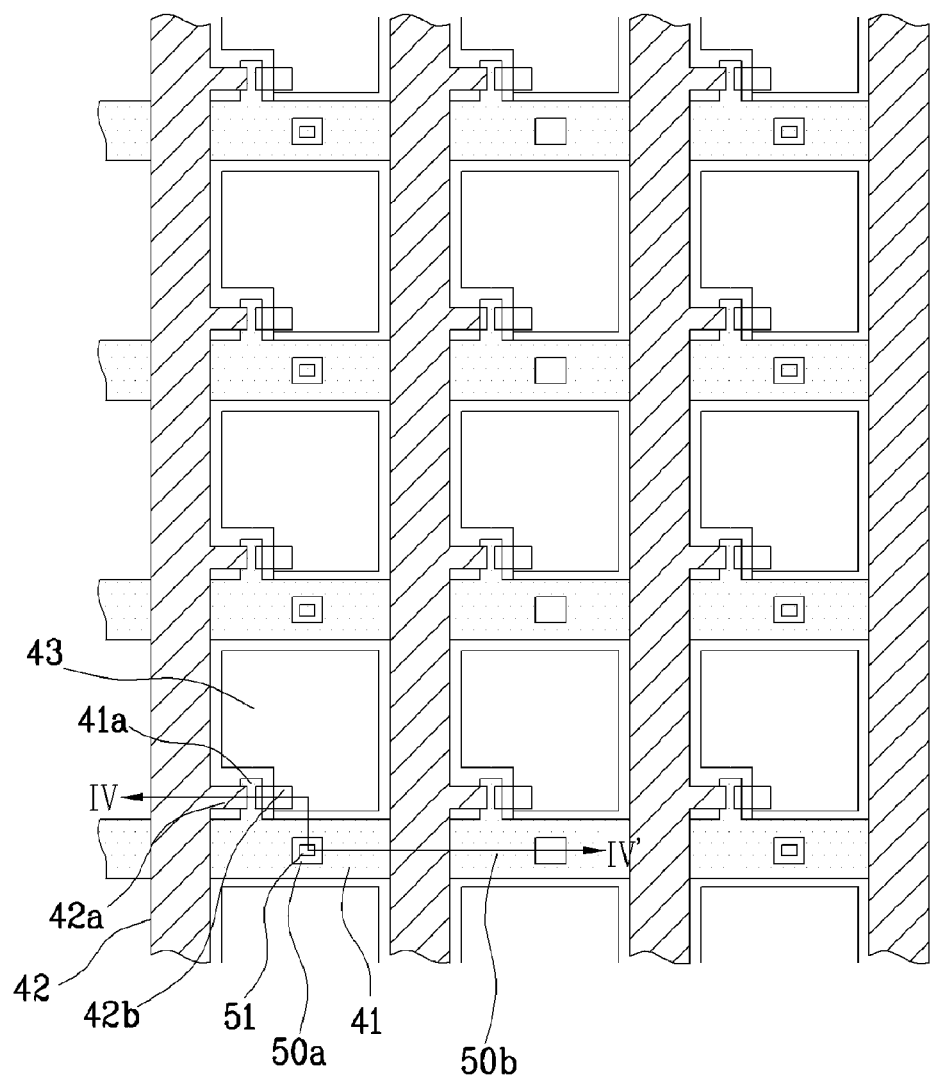
FIG. 19 is a plan view of an exemplary TN mode LCD device according to the present invention.
Figure 20:
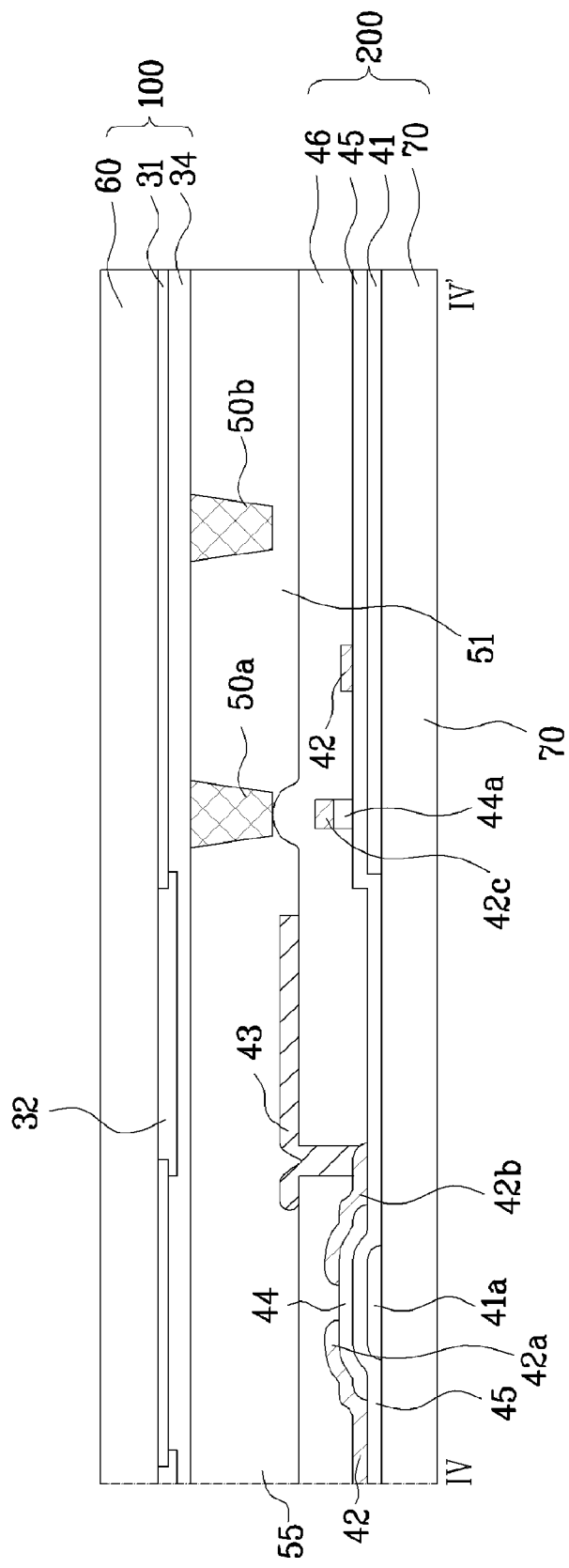
FIG. 20 is a cross sectional view along IV-IV' of FIG. 19 according to the present invention.

FIG. 19 is a plan view of an exemplary TN mode LCD) device according to the present invention, and FIG. 20 is a cross sectional view along IV-IV' of FIG. 19 according to the present invention. In FIG. 20, a color filter substrate 100 may include a black matrix layer 31, an R/G/B color filter layer 32, and a common electrode 34, all formed on a glass substrate 60. The black matrix layer 31 may exclude light from portions corresponding to gate and data lines and thin film transistors, except for pixel regions. The color filter layer 32 may be formed to produce various colored light at the portions corresponding to the pixel regions, and the common electrode 34 may be formed along an entire surface of the glass substrate 60 including the black matrix layer 31 and the color filter layer 32. Then, first and second column spacers 50a and 50b may be formed on predetermined portions of the common electrode 34, and may be formed of photosensitive resin.

In FIG. 20, a TFT substrate 200 may include a plurality of gate lines 41 and a plurality of data lines 42, all formed on a glass substrate 70. The gate and data lines 41 and 42 may cross each other, thereby defining a plurality of the pixel regions. In addition, pixel electrodes 43 may be formed within the pixel regions, and a thin film transistor may be formed at each of the crossing regions of the gate and data lines 41 and 42. Then, a projection, which may include a semiconductor layer 44a and the data line 42, may be formed on the gate line 41.

An exemplary method of fabricating the thin film transistor, the pixel electrode, and the projection may include deposition of a metal material, such as Mo, Al, or Cr, along an entire surface of the glass substrate 70 by a sputtering method, and patterned by photolithographic processes, thereby simultaneously forming the plurality of gate lines 41, wherein gate electrodes 41a may extend from the gate lines 41.

Subsequently, an insulating material of $SiN_x$ may be deposited along the entire surface of the glass substrate 70 including the gate lines 41, thereby forming a gate insulating layer 45. Then, the semiconductor layer 44 may be deposited on the gate insulating layer 45 above the gate electrode 41a, and patterned to form a first projection pattern 44a for forming the projection on the gate insulating layer 45 corresponding to the first column spacer 50a. For example, an amorphous silicon layer (or polysilicon layer) and a silicon layer heavily doped with phosphorous P may be sequentially deposited, and then simultaneously patterned, thereby forming the semiconductor layer 44.

Next, a metal material, such as Mo, Al, or Cr, may be deposited along the entire surface of the substrate by a sputtering method, and patterned by photolithographic processes, thereby forming the data line 42 perpendicular to the gate line 41. Then, source and drain electrodes 42a and 42b may be formed at both sides of the semiconductor layer 44, and a second projection pattern 42c may be formed on the first projection pattern 44a. Accordingly, the source electrode 42a may project from the data line 42. When patterning the source and drain electrodes 42a and 42b, a portion of the doped silicon layer between the source electrode 42a and the drain electrode 42b may be removed. Thus, the projection may be formed by the first and second projections patterns 44a and 42c.

Subsequently, a passivation layer 46 of $SiN_x$ may be formed along the entire surface of the substrate including the source electrode 42a and the drain electrode 42b using a CVD method. Alternatively, the passivation layer 46 may be formed of an organic material having a low dielectric constant, such as BCB, SOG, or acryl, to improve an aperture ratio of the liquid crystal cell. Then, the passivation layer 46 may be selectively etched on the drain electrode 42b, thereby forming a contact hole exposing a predetermined portion of the drain electrode 42b. In addition, a transparent conductive layer may be formed on the passivation layer 46 to be electrically connected to the drain electrode 42b through the contact hole. Then, the transparent conductive layer may be selectively removed to remain within the pixel region, thereby forming the pixel electrode 43 in the pixel region.

Although not shown, first and second alignment layers may be formed on the color filter substrate 100 and the TFT substrate 200, respectively, and then a rubbing process may be performed thereto. When rubbing the color filter and TFT substrates 100 and 200, the surfaces of the alignment layers may be rubbed with a cloth at a uniform pressure and speed. Thus, polymer chains of the alignment layers may be aligned along a predetermined direction, thereby determining an initial alignment direction of liquid crystal molecules of the liquid crystal layer 55. In addition, an upper surface of the projection 51 may be relatively smaller than a lower surface of the first column spacer 50a.

According to the present invention, a column spacer may be formed on a color filter substrate and projections may be formed on a TFT substrate. Alternatively, the column spacers may be formed on the TFT substrate and the projections may be formed on the color filter substrate.

According to the present invention, the first and second column spacers 50a and 50b may be spaced apart from the TFT substrate 200 at a predetermined interval of about 500 Å or more, whereby the projections may be selectively formed to have a height within the predetermined interval between the color filter and TFT substrates 100 and 200. Accordingly, the second column spacers may be formed having no corresponding projection to prevent formation of hollow regions within the LCD panel when the LCD panel is pressed with an external force. In addition, although the first and second column spacers 50a and 50b are shown to be formed on the color filter substrate 100, they also may be formed on the TFT substrate 200. Accordingly, when forming the first and second column spacers 50a and 50b on the TFT substrate, the projections may be formed on the color filter substrate 100 corresponding to the first and second column spacers 50a and 50b.

According to the present invention, as large-sized LCD panels are developed, the liquid crystal layer of the LCD device may be formed using a liquid crystal dispersion method to improve device yield. In addition, when the column spacers are formed within the LCD device, the projections corresponding to the column spacers may be formed to reduce frictional forces between the column spacers and the substrate. For example, although a surface of the LCD panel may be touched along a predetermined direction, the frictional forces may be reduced between the column spacers and the opposing substrate. Accordingly, formation of spots due to touch contact may be prevented by improving a restoring force of the liquid crystal layer, thereby improving luminance and sensitivity of the LCD panel. In addition, the projections may be selectively formed to correspond to the column spacers, whereby the column spacers may be formed having no corresponding projection to prevent formation of hollow region within the LCD panel when the LCD panel is pressed by an external force.

It will be apparent to those skilled in the art that various modifications and variations can be made in the liquid crystal display device and method of fabricating an LCD device of the present invention with departing from the spirit or scope of the invention. Thus, it is intended that the present invention cover the modifications and variations of this invention provided they come within the scope of the appended claims and their equivalents.

What is claimed is:

1. A method of fabricating a liquid crystal display (LCD) device, comprising:
    forming a plurality of column spacers on a first substrate;
    forming at least one projection on a second substrate corresponding to one of the column spacers;
    dispensing a liquid crystal material onto one of the first and second substrates;
    patterning a seal pattern on one of the first and second substrates; and
    bonding the first and second substrates together such that the one of the column spacers and the projection contact each other,
    wherein the forming at least one projection includes forming first and second projection patterns on the second substrate corresponding to the first column spacers at a predetermined interval from each other, and forming a third projection pattern on the second substrate partially overlapping the first and second projection patterns.

2. A method of fabricating a liquid crystal display (LCD) device, comprising:
   forming a plurality of first and second column spacers on a first substrate;
   forming at least one projection on a second substrate corresponding to one of the first column spacers;
   dispensing a liquid crystal material onto one of the first and second substrates;
   forming a seal pattern on one of the first and second substrates; and
   bonding the first and second substrates together such that the one of the first column spacers and the projection contact each other,
   wherein the forming at least one projection includes forming a first projection pattern on the second substrate, and forming a second projection pattern on the first projection pattern, and
   wherein an area of the first projection pattern is larger than an area of the second projection pattern.

3. A method of manufacturing a liquid crystal display (LCD) device, comprising:
   forming a plurality of first and second column spacers on a first substrate;
   forming a plurality of gate lines and gate electrodes on a second substrate;
   forming a gate insulating layer on an entire surface of the second substrate including the gate lines and the gate electrodes;
   forming a semiconductor layer on the gate insulating layer above the gate electrode;
   forming a plurality of data lines on the second substrate perpendicular to the gate lines to define a plurality of pixel regions and source and drain electrodes at both sides of the semiconductor layer;
   forming a passivation layer on the second substrate having a contact hole including the drain electrode;
   forming a plurality of pixel electrodes on the passivation layer, each connected to the drain electrode;
   forming at least one projection on the second substrate corresponding to one of the first column spacers;
   dispensing a liquid crystal material onto one of the first and second substrates;
   forming a seal pattern on one of the first and second substrates; and
   bonding the first and second substrates together such that the one of the first column spacers and the projection contact each other,
   wherein each of the first and second column spacers are formed of the same material as the projection.

4. A method of manufacturing a liquid crystal display (LCD) device, comprising:
   forming a plurality of first and second column spacers on a first substrate;
   forming a plurality of gate lines and gate electrodes on a second substrate;
   forming a gate insulating layer on an entire surface of the second substrate including the gate lines and the gate electrodes;
   forming a semiconductor layer and a first projection pattern on the gate insulating layer corresponding to the gate electrodes and the first column spacers;
   forming a plurality of data lines on the second substrate perpendicular to the gate lines to define a plurality of pixel regions, source and drain electrodes at both sides of the semiconductor layer, and a second projection pattern on the first projection pattern to partially overlap the first projection pattern;
   forming a passivation layer along an entire surface of the second substrate and having a contact hole including the drain electrode;
   forming a plurality of pixel electrodes on the passivation layer, each connected to the drain electrode;
   dispensing a liquid crystal material onto one of the first and second substrates;
   forming a seal pattern on one of the first and second substrates; and
   bonding the first and second substrates together such that the one of the first column spacers and the projection contact each other.

5. A method of manufacturing a liquid crystal display (LCD) device, comprising:
   forming a plurality of first and second column spacers on a first substrate;
   forming a plurality of gate lines each having a gate electrode, and a common line having a plurality of common electrodes, on the second substrate;
   forming a gate insulating layer on an entire surface of the second substrate including the gate lines and the common line;
   forming a semiconductor layer and a first projection pattern on the gate insulating layer corresponding to one of the gate electrodes and one of the first column spacers;
   forming a plurality of data lines on the second substrate perpendicular to the gate lines to define a plurality of pixel regions, source and drain electrodes at both sides of the semiconductor layer, and a second projection pattern on the first projection pattern to partially overlap the first projection pattern;
   forming a passivation layer along an entire surface of the second substrate having a contact hole including the drain electrode;
   forming a plurality of pixel electrodes on the passivation layer, each connected to the drain electrode and parallel to the common electrodes within one of the pixel regions;
   dispensing a liquid crystal material onto one of the first and second substrates;
   forming a seal pattern on one of the first and second substrates; and
   bonding the first and second substrates together such that the one of the first column spacers and the first and second projection patterns contact each other.

6. A method of manufacturing a liquid crystal display (LCD) device, comprising:
   preparing first and second substrates having a plurality of pixel regions;
   forming a plurality of projections on the second substrate each corresponding to one of the pixel regions;
   forming first and second column spacers on the first substrate within two different ones of the pixel regions at every three pixel regions, each of the first column spacers overlapping one of the projections, and each of the second column spacers not overlapping the projections;
   dispensing a liquid crystal material onto one of the first and second substrates;
   forming a seal pattern on one of the first and second substrates; and
   bonding the first and second substrates together such that the one of the first column spacers and the projections contact each other.

7. The method according to claim 6, further comprising forming at least one alignment layer on one of the first substrate having the first and second column spacers fixed thereto and the second substrate having the projections.

8. A method of manufacturing a liquid crystal display (LCD) device, comprising:
- preparing first and second substrates; forming a gate line and a gate electrode on the second substrate;
- forming a gate insulating layer on an entire surface of the second substrate including the gate line and the gate electrode;
- forming a semiconductor layer and a first projection pattern on the gate insulating layer corresponding to the gate electrode and a predetermined portion of the gate line;
- forming a data line on the second substrate perpendicular to the gate line to define a pixel region, source and drain electrodes at both sides of the semiconductor layer, and a second projection pattern on the first projection pattern;
- forming a passivation layer on the second substrate and having a contact hole including the drain electrode;
- forming a pixel electrode on the passivation layer connected to the drain electrode with the pixel region;
- forming first and second column spacers within the first pixel region and a second pixel region at every third pixel region on the first substrate, the first column spacer overlapping one of a plurality of projections on the second substrate, and the second column spacer not overlapped by the projections;
- dispensing a liquid crystal material onto one of the first and second substrates;
- forming a seal pattern on one of the first and second substrates; and
- bonding the first and second substrates together such that the first column spacer overlapping the one of the plurality of projections contact each other.

* * * * *